(12) United States Patent
Ju et al.

(10) Patent No.: US 10,904,891 B2
(45) Date of Patent: Jan. 26, 2021

(54) EDGE-ASSISTED DATA TRANSMISSION FOR CONNECTED VEHICLES

(71) Applicant: TOYOTA JIDOSHA KABUSHIKI KAISHA, Toyota (JP)

(72) Inventors: Qianao Ju, Atlanta, GA (US); BaekGyu Kim, Cupertino, CA (US); Chung-Wei Lin, Sunnyvale, CA (US); Shinichi Shiraishi, San Jose, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 15/921,320

(22) Filed: Mar. 14, 2018

(65) Prior Publication Data
US 2019/0289610 A1    Sep. 19, 2019

(51) Int. Cl.
  *H04W 72/08*   (2009.01)
  *H04L 29/08*   (2006.01)
  *H04W 4/40*    (2018.01)
  *H04L 29/06*   (2006.01)
  *H04W 24/10*   (2009.01)

(52) U.S. Cl.
  CPC ....... *H04W 72/085* (2013.01); *H04L 65/1036* (2013.01); *H04L 65/80* (2013.01); *H04L 67/04* (2013.01); *H04L 67/18* (2013.01); *H04W 4/40* (2018.02); *H04W 24/10* (2013.01)

(58) Field of Classification Search
  CPC ...... H04L 65/1036; H04L 67/18; H04W 4/40; H04W 72/085
  See application file for complete search history.

(56) References Cited

U.S. PATENT DOCUMENTS

| 2008/0129475 | A1 | 6/2008 | Breed et al. |
| 2010/0232404 | A1* | 9/2010 | Chen ............ G08G 1/094 370/338 |
| 2012/0259951 | A1 | 10/2012 | Schalk et al. |
| 2013/0138714 | A1 | 5/2013 | Ricci |
| 2013/0219039 | A1 | 8/2013 | Ricci |
| 2013/0301584 | A1 | 11/2013 | Addepalli et al. |

FOREIGN PATENT DOCUMENTS

| JP | 2003152627 A | 5/2003 |
| JP | 2010204949 A | 9/2010 |
| JP | 2010204949 A * | 9/2010 |

OTHER PUBLICATIONS

Gangadharan et al., "Bandwidth Optimal Data/Service Delivery for Connected Vehicles via Edges," IEEE International Conference on Cloud Computing, San Francisco, CA, USA, Jul. 2-7, 2018, 8 pgs.
First Office Action of Japanese Application No. 2019-039147, dated Feb. 25, 2020 (4 pages).

* cited by examiner

*Primary Examiner* — Rhonda L Murphy
(74) *Attorney, Agent, or Firm* — VLP Law Group LLP; Michel Bohn

(57) ABSTRACT

In an example embodiment, a method receives a first request of a first vehicle for a content item; receives travel data of the first vehicle including a first vehicle route of the first vehicle; determines first edge server(s) located on the first vehicle route of the first vehicle; segments the content item into content segment(s) based on the travel data of the first vehicle and edge information of each first edge server; and dispatches each content segment to the corresponding first edge server for transmission to the first vehicle.

20 Claims, 10 Drawing Sheets

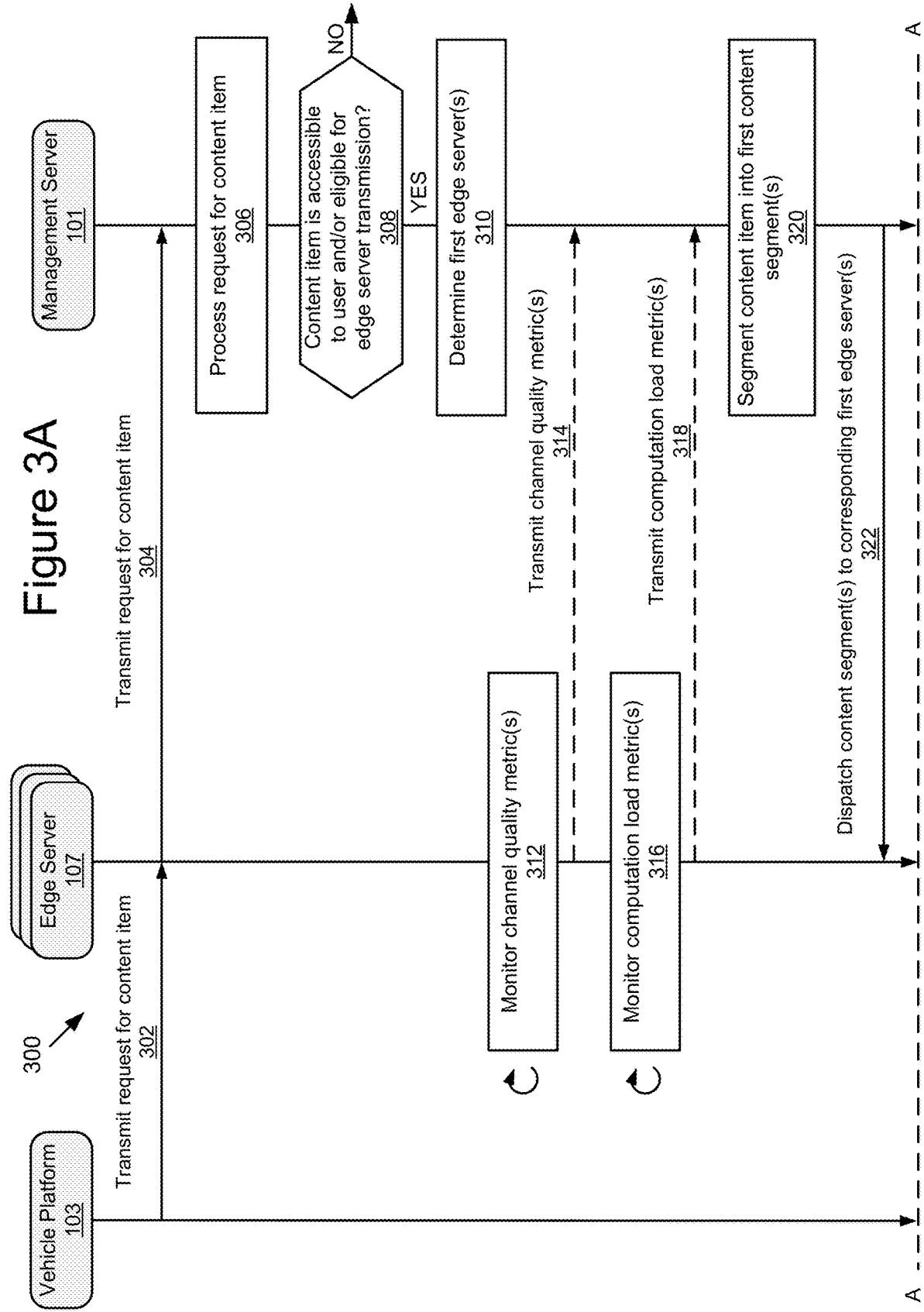

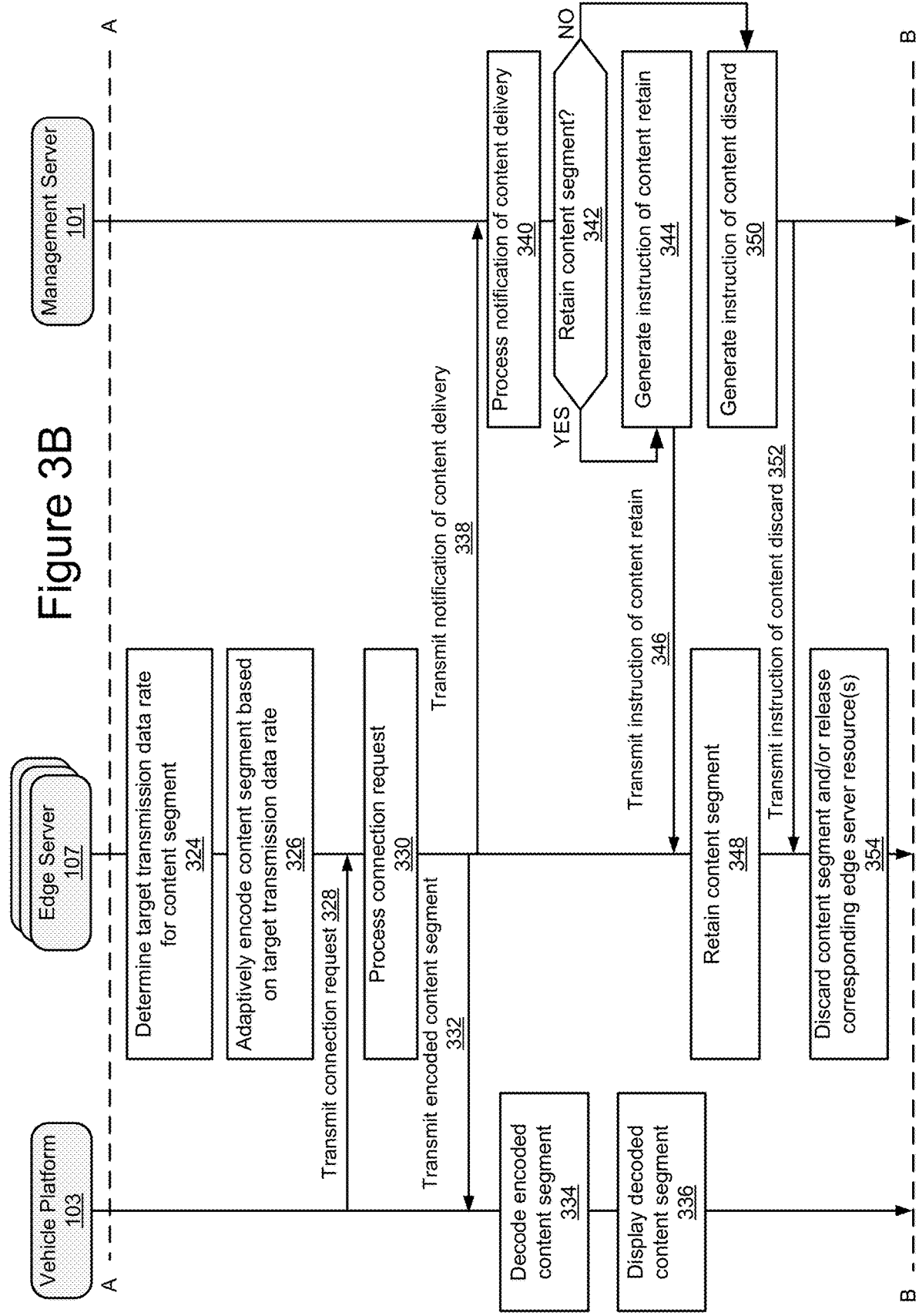

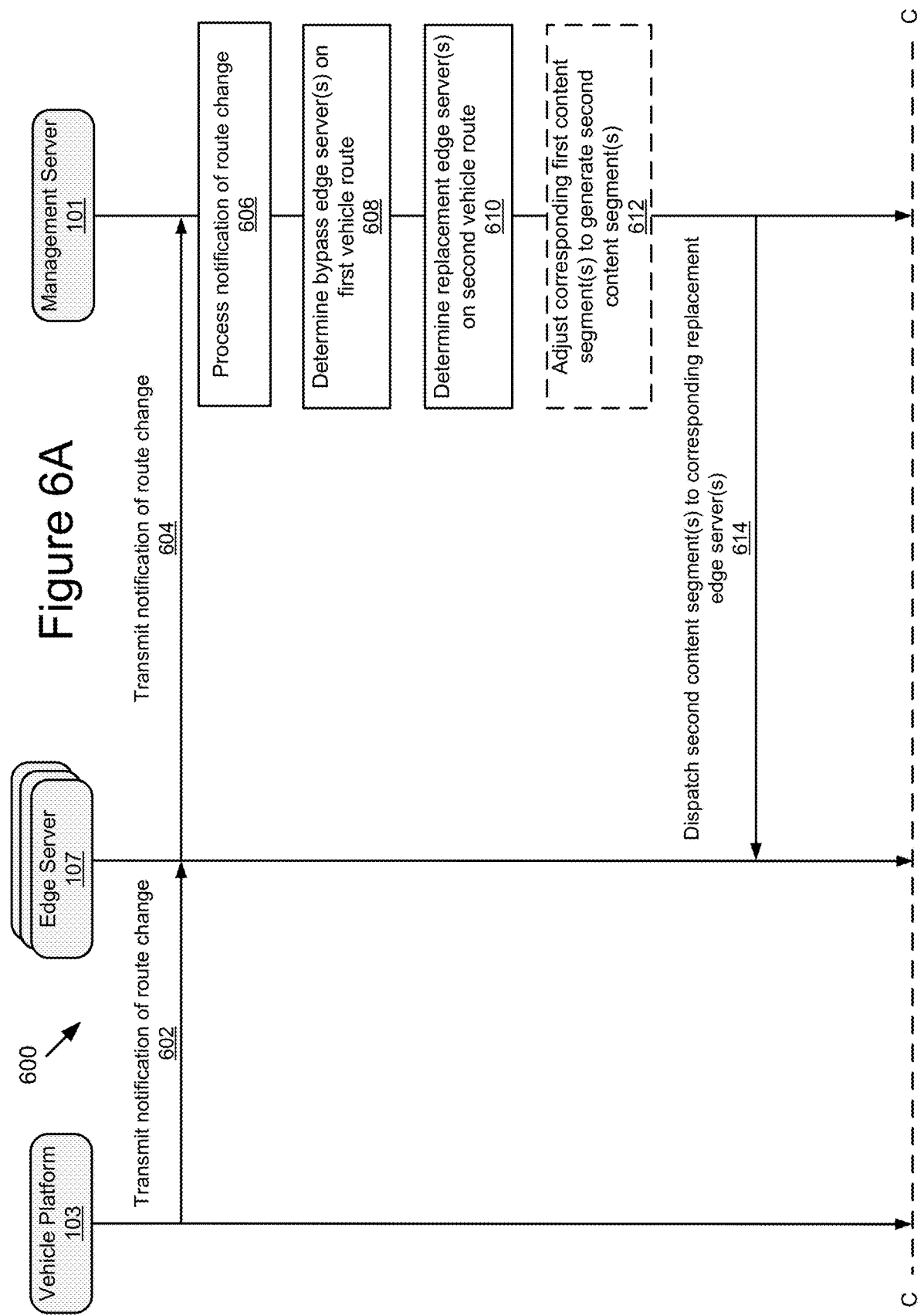

ure EDGE-ASSISTED DATA TRANSMISSION FOR CONNECTED VEHICLES

BACKGROUND

The present disclosure relates to vehicle data transmission. In a more particular example, the disclosure relates to technologies for efficiently provisioning data for vehicles in transit.

Modern vehicles are often provided with wireless capability for receiving various types of content data as the vehicles travel along the roads. Content data can significantly improve the driving experience of the vehicles. However, in the vehicle context, the content data is usually in the form of multimedia content transmitted in real-time (e.g., entertainment content, driving assistance information, etc.) with large volume of data and strict requirements of latency and network jitter. Therefore, it is challenging to transmit content data to the vehicles with high quality of service.

Today, some modern vehicles rely on edge servers for data transmission in vehicle context. These vehicles often require data segmentation because it is generally impractical or possible to complete the data transmission within the coverage area of a single edge server due to the large size of data file and the speed at which vehicles move. However, such data segmentation generally cannot adapt to specific driving scenario of each individual vehicle, and thus causing inefficiency and discontinuity in data transmission. In addition, the edge servers usually have limited network capability and computation capability due to their limited amount of hardware resources. However, the existing techniques are typically unable to adjust the transmission data rate of each data segment according to the performance conditions of the corresponding edge server.

SUMMARY

The subject matter described in this disclosure overcomes the deficiencies and limitations of the existing solutions by providing novel technology for data transmission in the vehicle context.

According to one innovative aspect of the subject matter described in this disclosure, a computer-implemented method comprises: receiving a first request of a first vehicle for a content item; receiving travel data of the first vehicle including a first vehicle route of the first vehicle; determining one or more first edge servers located on the first vehicle route of the first vehicle; segmenting the content item into one or more content segments based on the travel data of the first vehicle and edge information of each first edge server; and dispatching each content segment to the corresponding first edge server for transmission to the first vehicle.

In general, another innovative aspect of the subject matter described in this disclosure may be embodied in computer-implemented methods comprising: receiving by an edge server, from a management server, a content segment of a content item requested by a first vehicle; determining, by the edge server, one or more performance metrics of the edge server; computing, by the edge server, a target transmission data rate for the content segment based on the one or more performance metrics of the edge server; adaptively encoding, by the edge server, the content segment using the target transmission data rate to generate an encoded content segment; receiving, by the edge server, a connection request from the first vehicle; and responsive to receiving the connection request from the first vehicle, transmitting, by the edge server, the encoded content segment to the first vehicle.

In general, another innovative aspect of the subject matter described in this disclosure may be embodied in systems comprising: one or more processors; one or more memories storing instructions that, when executed by the one or more processors, cause the system to: receive a first request of a first vehicle for a content item; receive travel data of the first vehicle including a first vehicle route of the first vehicle; determine one or more first edge servers located on the first vehicle route of the first vehicle; segment the content item into one or more content segments based on the travel data of the first vehicle and edge information of each first edge server; and dispatch each content segment to the corresponding first edge server for transmission to the first vehicle.

In general, another innovative aspect of the subject matter described in this disclosure may be embodied in systems comprising: one or more processors; one or more memories storing instructions that, when executed by the one or more processors, cause the system to: receive, from a management server, a content segment of a content item requested by a first vehicle; determine one or more performance metrics of the system; compute a target transmission data rate for the content segment based on the one or more performance metrics of the system; adaptively encode the content segment using the target transmission data rate to generate an encoded content segment; receive a connection request from the first vehicle; and responsive to receiving the connection request from the first vehicle, transmit the encoded content segment to the first vehicle.

These and other implementations may each optionally include one or more of the following features: that the edge information of each first edge server includes coverage data describing a communication coverage area of the first edge server and one or more performance metrics of the first edge server; that the travel data of the first vehicle includes a vehicle speed of the first vehicle, and segmenting the content item into the one or more content segments includes determining an estimated connection duration of the first vehicle with each first edge server using the vehicle speed of the first vehicle and a communication coverage area of the corresponding first edge server, and segmenting the content item into the one or more content segments using the estimated connection duration of the first vehicle with each first edge server and a content duration of the content item; that dispatching each content segment to the corresponding first edge server for transmission to the first vehicle includes determining that a first content segment among the one or more content segments is previously retained at the corresponding first edge server, and responsive to determining that the first content segment is previously retained at the corresponding first edge server, transmitting an instruction of retained content delivery instructing the corresponding first edge server to retrieve the first content segment previously retained at the corresponding first edge server for transmission to the first vehicle; that determines an estimated connection start time of the first vehicle with each first edge server based on a vehicle speed of the first vehicle and a communication coverage area of the corresponding first edge server, and dispatching each content segment to the corresponding first edge server for transmission to the first vehicle includes dispatching each content segment to the corresponding first edge server prior to the estimated connection start time; that receives, from a first edge server among the one or more first edge servers, a notification of content delivery indicating that a first content segment corresponding to the first edge server among the one or more content segments is transmitted to the first vehicle, determines that the first content segment is to be retained at the first edge server, and responsive to determining that the first content segment is to be retained at the first edge server, transmits an instruction of content retain instructing the first edge server to retain the first content segment; that determining that the first content segment is to be retained at the first edge server includes receiving a second request of a second vehicle for the content item, receiving travel data of the second vehicle including a second vehicle route of the second vehicle, and determining that the first edge server is located on the second vehicle route of the second vehicle; that determining that the first content segment is to be retained at the first edge server includes determining a demand score of the content item, and determining that the demand score of the content item satisfies a predetermined score threshold; that receives a notification of route change including a second vehicle route of the first vehicle, determines one or more bypass edge servers located on the first vehicle route of the first vehicle, determines one or more replacement edge servers located on the second vehicle route of the first vehicle, determines, from the one or more content segments of the content item, one or more first content segments corresponding to the one or more bypass edge servers, and dispatches the one or more first content segments corresponding to the one or more bypass edge servers to the one or more replacement edge servers for transmission to the first vehicle; that receives a notification of route change including a second vehicle route of the first vehicle, determines one or more bypass edge servers located on the first vehicle route of the first vehicle, determines one or more replacement edge servers located on the second vehicle route of the first vehicle, determines, from the one or more content segments of the content item, one or more first content segments corresponding to the one or more bypass edge servers, adjusts the one or more first content segments to generate one or more second content segments using edge information of each replacement edge server, and dispatches the one or more second content segments to the one or more replacement edge servers for transmission to the first vehicle; that determines that the one or more first content segments are dispatched to the one or more bypass edge servers; responsive to determining that the one or more first content segments are dispatched to the one or more bypass edge servers, determines that the one or more first content segments are to be discarded at the one or more bypass edge servers, responsive to determining that the one or more first content segments are to be discarded at the one or more bypass edge servers, transmits an instruction of content discard instructing the one or more bypass edge servers to discard the one or more first content segments; and that the instruction of content discard instructs the one or more bypass edge servers to release one or more edge server resources allocated to the one or more first content segments.

These and other implementations may each optionally include one or more of the following features: that determining the one or more performance metrics of the edge server includes monitoring one or more channel quality metrics indicating a channel quality of a communication channel between the edge server and one or more vehicles communicatively coupled to the edge server, and monitoring one or more computation load metrics indicating a computation load condition of the edge server; that the one or more channel quality metrics includes one or more of a signal to noise ratio metric, a link quality indicator metric, and a packet receive rate metric, and the one or more computation load metrics includes a number of vehicles communicatively coupled to the edge server, a bandwidth metric, a data throughput metric, and an amount of available storage space of the edge server; that receives, from the management server, an instruction of content discard associated with the content segment, responsive to receiving the instruction of content discard associated with the content segment, discards one or more of the content segment and the encoded content segment at the edge server, and releases one or more edge server resources of the edge server allocated for the content segment; that receives, from the management server, an estimated connection start time of the first vehicle with the edge server, and adaptively encoding the content segment includes adaptively encoding the content segment prior to the estimated connection start time of the first vehicle with the edge server; that receives, from the management server, an instruction of retained content delivery associated with the content segment, and responsive to receiving the instruction of retained content delivery associated with the content segment, adaptively encoding the content segment includes retrieving the content segment from a data store of the edge server, and adaptively encoding the content segment using the target transmission data rate to generate the encoded content segment; and that receives, from the management server, an instruction of retained content delivery associated with the content segment, and responsive to receiving the instruction of retained content delivery associated with the content segment, transmitting the encoded content segment to the first vehicle includes retrieving the encoded content segment from a data store of the edge server, and transmitting the encoded content segment to the first vehicle.

Other implementations of one or more of these and other aspects include corresponding systems, apparatus, and computer programs, configured to perform the actions of methods, encoded on non-transitory computer storage devices.

The novel technology for data transmission in vehicle context presented in this disclosure is particularly advantageous in a number of respects. For example, the technology described herein is capable of segmenting the content item based on the travel route and mobility of the vehicles. Therefore, the segmentation of the content item can be adapted to specific driving scenarios of each individual vehicle, and thus the continuity of the data transmission can be improved. As a further example, the present technology is capable of simultaneously dispatching multiple content segments of the content item to multiple edge servers located on the vehicle route, and the edge servers may encode of the content segments before the vehicle is communicatively coupled to the edge servers. As the encoded content segments are generated in advance and ready for transmission before the connections between the vehicle and the corresponding edge servers are established, the data transmission latency can be significantly reduced. Furthermore, the technology described herein can adjust the transmission data rate for each content segment of the content item individually according to the channel quality and the computation load of the corresponding edge server. Therefore, each content segment of the content item can be encoded with optimal content quality while the overall quality of service can still be maintained for all vehicles connected to the corresponding edge server that transmits the content segment.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

FIGS. 3A and 3B illustrate a flowchart of an example method for transmitting data to and from connected vehicles using edge servers.

FIGS. 6A and 6B illustrate a flowchart of an example method for transmitting data to and from connected vehicles using edge servers upon a dynamic change in vehicle route.

DESCRIPTION

The technology described herein can effectively transmit data to and from connected vehicles using edge servers. As described in further detail below, the technology includes various aspects, such as but not limited to methods and corresponding systems, that can determine one or more edge servers located on the vehicle route of the vehicle, segment the content item into multiple content segments based on the travel data of the vehicle and the edge information of the one or more edge servers, and dispatch each content segment to the corresponding edge server. A corresponding edge server may adaptively encode the content segment based on its performance condition, and transmit the encoded content segment to the vehicle as the vehicle drives through its communication coverage area. The vehicle may receive the encoded content segment, decode the encoded content segment, and display the decoded content segment for user consumption in real-time.

Figure 1A:
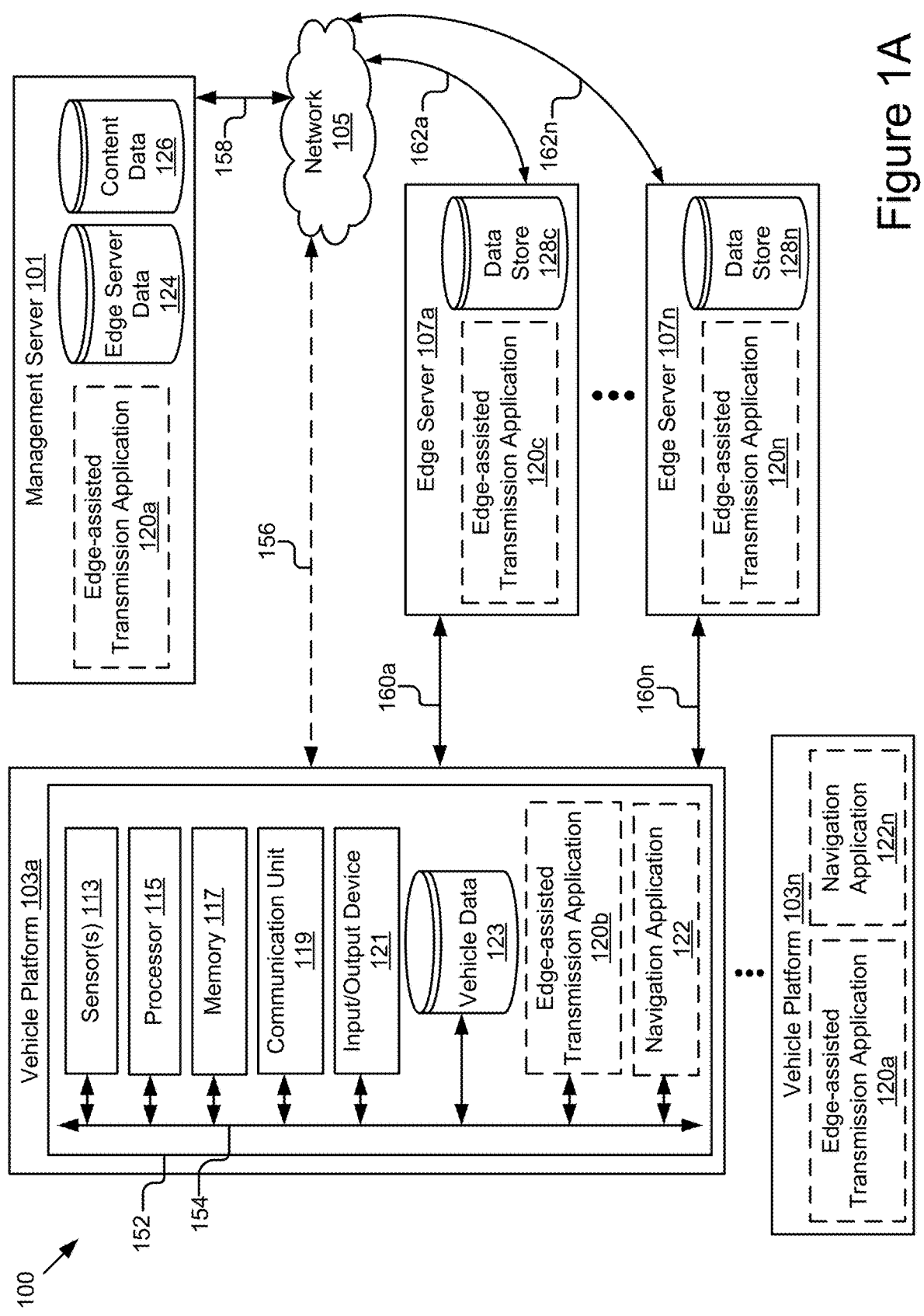
FIG. 1A is a block diagram of an example system for transmitting data to and from connected vehicles using edge servers.

FIG. 1A is a block diagram of an example system 100 for transmitting data to and from connected vehicles using edge servers. As shown, the system 100 includes a management server 101, one or more vehicle platforms 103a . . . 103n, and one or more edge servers 107a . . . 107n. The management server 101 and the one or more edge servers 107a . . . 107n may be coupled for electronic communication via a network 105. The one or more vehicle platforms 103a . . . 103n may be coupled to the one or more edge servers 107a . . . 107n for electronic communication with other components of the system 100 via the network 105. In FIG. 1 and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of vehicle platforms 103, edge servers 107, networks 105, or management servers 101.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-infrastructure/infrastructure-to-vehicle (V2I/I2V) networks, vehicle-to-infrastructure/infrastructure-to-cloud (V2I/I2C) networks, vehicle-to-infrastructure/vehicle-to-everything (V2I/V2X) networks, or any other wireless networks. Although FIG. 1 illustrates a single block for the network 105 that couples to the management server 101 and the edge server(s) 107, it should be understood that the network 105 may in practice comprise any number of combination of networks, as noted above.

The vehicle platform(s) 103 include computing device(s) 152 having sensor(s) 113, processor(s) 115, memory(ies) 117, communication unit(s) 119, an input/output device 121, a vehicle data store 123, an edge-assisted transmission application 120, and a navigation application 122. Examples of computing device(s) 152 may include virtual or physical computer processors, control units, micro-controllers, etc., which are coupled to other components of the vehicle platform(s) 103, such as one or more sensors 113, actuators, motivators, etc. The vehicle platform(s) 103 may be temporarily coupled to one or more of the edge servers 107 via signal line 160 (e.g., V2I connection) to obtain network access to the network 105 as the vehicle platform(s) 103 travel along the roads. For example, each vehicle platform 103 may send and receive data to and from other vehicle platform(s) 103, other edge servers 107, and/or the management server(s) 101 via the network 105 through the edge server 107 to which the vehicle platform 103 is currently connected at a particular point in time. In some embodiments, the vehicle platform(s) 103 may be communicatively coupled to the network 105 in a direct manner, as reflected by signal line 156. In some embodiments, the vehicle platform(s) 103 are capable of transporting from one point to another. Non-limiting examples of the vehicle platform(s) 103 include a vehicle, an automobile, a bus, a boat, a plane, a bionic implant, a robot, or any other platforms with non-transitory computer electronics (e.g., a processor, a memory or any combination of non-transitory computer electronics). The vehicle platform(s) 103 may be referred to herein as vehicle(s).

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the vehicle platform 103, the processor may be an electronic control unit (ECU) implemented in the vehicle platform 103 such as a car, although other types of platform are also possible and contemplated. The ECUs may receive and store the sensor data (e.g., the Global Positioning System (GPS) data) as vehicle operation data in the vehicle data store 123 for access and/or retrieval by the edge-assisted transmission application 120. In some implementations, the processor(s) 115 may be capable of generating and providing electronic display signals to the input/output device(s) 121, supporting the display of images, capturing and transmitting images, performing complex tasks including various types of data decoding and route change detection, etc. In some implementations, the processor(s) 115 may be coupled to the memory(ies) 117 via the bus 154 to access data and instructions therefrom and store data therein. The bus 154 may couple the processor(s) 115 to the other components of the vehicle platform(s) 103 including, for example, the sensor(s) 113, the memory(ies) 117, the communication unit(s) 119, the input/output device(s) 121, and/or the vehicle data store 123.

Figure 1B:
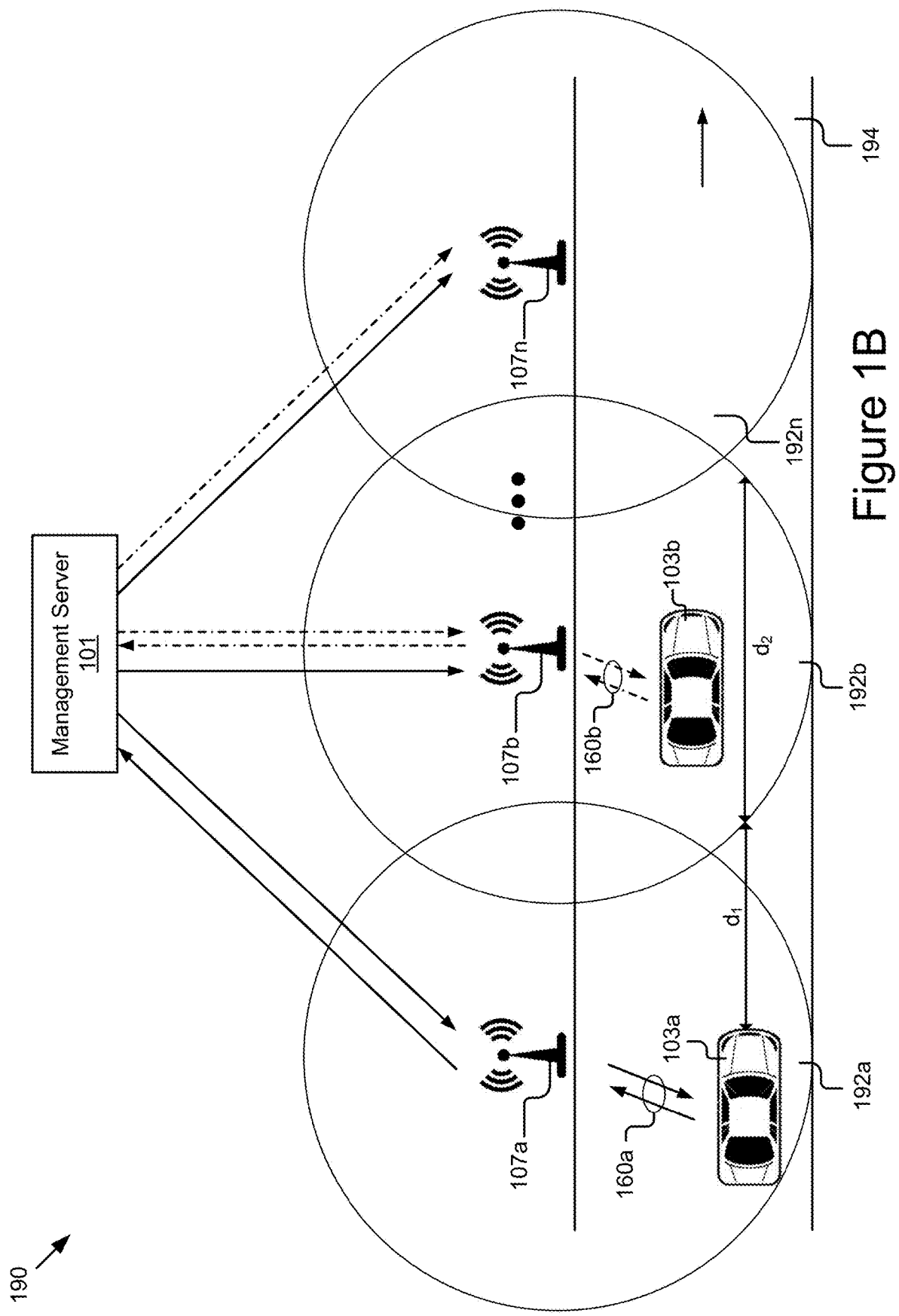
FIG. 1B illustrates an example road segment with multiple communication coverage areas of multiple edge servers.

The edge-assisted transmission application 120 is computer logic executable to transmit data to and from the connected vehicles using edge servers. As illustrated in FIG. 1, the management server 101 may include the instance 120a, the vehicle platform 103a . . . 103n may include the instances 120b . . . 120m, and the edge servers 107a . . . 107n may include the instances 120c . . . 120n of the edge-assisted transmission application 120. In some embodiments, each instance 120a, 120b . . . 120m, and 120c . . . 120n may comprise one or more components the edge-assisted transmission application 120 depicted in FIG. 2, and may be configured to fully or partially perform the functionalities described herein depending on where the instance resides. In some embodiments, the edge-assisted transmission application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The edge-assisted transmission application 120 may receive and process the vehicle data and/or the content data, and communicate with other elements of the vehicle platform 103 via the bus 154, such as the memory 117, the communication unit 119, the input/output device 121, the vehicle data store 123, etc. The edge-assisted transmission application 120 is described in details below with reference to at least FIGS. 1B-7.

The navigation application 122 is computer logic executable to provide navigational guidance to users to follow a vehicle route. In some embodiments, the navigation application 122 may be implemented using software executable by one or more processors of one or more computer devices, using hardware, such as but not limited to a field-programmable gate array (FPGA), an application-specific integrated circuit (ASIC), etc., and/or a combination of hardware and software, etc. In some embodiments, the navigation application 122 may perform path planning to determine one or more vehicle routes to a destination, generate navigation instructions corresponding to each vehicle route, and provide the navigation instructions of the vehicle route selected or followed by the user via the input/output device 121 of the vehicle platform 103. In some embodiments, the navigation application 122 may detect dynamic changes in planned vehicle route as the vehicle platform 103 travels along the roads and automatically recalculate the vehicle route to the destination accordingly. In some embodiments, the navigation application 122 may process and store the vehicle route of the vehicle platform 103 as the vehicle data in the vehicle data store 123 for access and/or retrieval by the edge-assisted transmission application 120.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store the edge-assisted transmission application 120 and/or the navigation application 122. In some implementations, the memory(ies) 117 may include one or more of volatile memory and non-volatile memory. For example, the memory(ies) 117 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory(ies) 117 may be a single device or may include multiple types of devices and configurations.

The communication unit 119 transmits data to and receives data from other computing devices to which it is communicatively coupled (e.g., via the network 105 through the edge servers 107) using wireless and/or wired connections. In some embodiments, the communication unit 119 may couple to the edge servers 107 to obtain network access to the network 105 and communicate with other computing nodes, such as other vehicle platform(s) 103 and/or the management server(s) 101, etc. via the network 105. The communication unit 119 may include one or more wired interfaces and/or wireless transceivers for sending and receiving data. The communication unit 119 may exchange data with other computing nodes using standard communication methods, such as those discussed above.

The input/output (I/O) devices 121 include any standard devices for inputting and/or outputting information. Non-limiting example IO devices 121 include a screen for displaying notifications (e.g., notification of connection establishment, notification of route recalculation, etc.), indicators, an audio reproduction device (e.g., speaker), a microphone, and any other I/O components for facilitating communication and/or interaction with users. Input/output devices 121 can be coupled to the computing device 152 either directly or through intervening I/O controllers.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geo-location sensors (e.g., GPS sensors), orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, and/or left side of the vehicle platform 103 in order to capture the situational context surrounding the vehicle platform 103.

The vehicle data store 123 includes a non-transitory storage medium that stores various types of data. For example, the vehicle data store 123 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., vehicle speed, acceleration, deceleration, wheel speed (Revolutions Per Minute—RPM), steering angle, braking force, etc. In some embodiments, the vehicle data may include a vehicle identifier (ID) uniquely identifying the vehicle platform 103 (e.g., Vehicle Identification Number (VIN)). In some embodiments, the vehicle data may also include a vehicle geolocation (e.g., GPS coordinates) indicating the geographic location of the vehicle platform 103, the vehicle route currently followed by the vehicle platform 103 to get to a destination, etc.

The management server 101 includes a hardware and/or virtual server that includes a processor, a memory, and network communication capabilities (e.g., a communication unit). In some embodiments, the management server 101 may be a computing server located remotely from the roads on which the vehicle platforms 103 travel. For example, the management server 101 may be a cloud server residing in a data center. The management server 101 may be communicatively coupled to the network 105, as reflected by signal line 158. In some embodiments, the management server 101 may send and receive data to and from other entities of the system 100, e.g., one or more edge servers 107, one or more vehicle platforms 103, etc. via the network 105. In some embodiments, the management server 101 may be provided with large amount of hardware resources, computation capabilities, and/or network capabilities for supporting and managing the data transmission of multiple edge servers 107. For example, the management server 101 may have massive storage capacity, stationary and reliable network connections with large bandwidth. As depicted, the management server 101 may include an instance of the edge-assisted transmission application 120a, an edge server data store 124, and a content data store 126 that store various types of data for access and/or retrieval by this application.

In some embodiments, the edge server data store 124 includes a non-transitory storage medium that stores edge information describing one or more edge servers 107. In some embodiments, the edge information associated with each edge server 107 may include a unique edge server ID, an edge server geolocation indicating geographic location (e.g., GPS coordinates) of the edge server 107, coverage data describing a communication coverage area of the edge server 107, etc. In some embodiments, the communication coverage area of a particular edge server 107 may be the coverage area within which the edge server 107 can communicate with the vehicle platforms 103. Non-limiting examples of the coverage data include, but are not limited to, coverage geolocation (e.g., GPS coordinates), coverage boundary (e.g., geometric shape and size), etc. of the communication coverage area. In some embodiments, the edge server data store 124 may store an edge server map indicating the edge server location and/or the communication coverage area of multiple edge servers 107 managed by the management server 101. In some embodiments, the edge information associated with each edge server 107 may also include performance metrics (e.g., channel quality metrics, computation load metrics, etc.) and/or the amount of edge server resources (e.g., network bandwidth, memory space, processing capacity, etc.) currently available at the edge server 107. Other types of edge information are also possible and contemplated.

In some embodiments, the content data store 126 includes a non-transitory storage medium that stores multiple content items to be transmitted to the vehicle platforms 103 upon request. Non-limiting examples of the content items include, but are not limited to, content documents (e.g., data files) stored in personal cloud storage of the users, multimedia content (e.g., videos, audios, photos, augmented reality data stream, virtual reality data stream, etc.) provided by third-party content providers (e.g., media streaming services), etc. In some embodiments, the transmission of the content item to the vehicle platform 103 may require the user associated with the vehicle platform 103 to be authenticated and/or granted permission to access the content item. As an example, the user may be required to subscribe to the media streaming service in advance and successfully login to the media streaming service with verified credentials. In some embodiments, the transmission of the content item to the vehicle platform 103 through the edge servers 107 may additionally require approval of the content owner for the content item to be transmitted using edge servers, because of the potential risks of content security and potential limited content quality.

In some embodiments, each content item stored in the content data store 126 may include item metadata and content data of the content item. Non-limiting examples of the item metadata include, but are not limited to, a unique content item ID, a content title (e.g., "Landslide"), a content type (e.g., video), a content duration (e.g., 4:30, 260 seconds), etc. of the content item. In some embodiments, the item metadata may also include an edge server approval status indicating whether the content item is allowed to be transmitted via edge servers, access control settings specifying one or more levels of access associated with the content item, etc. Other types of item metadata are also possible and contemplated.

In some embodiments, the content data store 126 may also store multiple content segments of the content items. Each content segment of a content item may include segment metadata and content data of the content segment. In some embodiments, the segment metadata of the content segment stored in the content data store 126 of the management server 101 may include a unique content segment ID, the content item ID of the content item including the content segment, a relative position of the content segment within the content item (e.g., start time of "3:05", end time of "4:10"), etc. In some embodiments, the segment metadata may also include the vehicle ID of the vehicle platform 103 to which the content segment is transmitted for consumption, the edge server ID(s) of the edge server(s) 107 to which the content segment is dispatched, a dispatch status indicating whether the content segment is already dispatched to the edge server(s) 107, the estimated connection start time indicating the estimated time at which the vehicle platform 103 potentially connected to the edge server(s) 107 to start receiving content data, etc. Other types of segment metadata are also possible and contemplated.

In some embodiments, the content data store 126 may also store a list of retained content segments. The list of retained content segments may include one or more retained segment entries storing the segment metadata of one or more retained content segments. In some embodiments, the retained contents segment may be the content segments that are retained at the edge servers 107 after the transmission of the content segments from the edge servers 107 to one or more vehicle platforms 103 is completed, because such content segments may likely be needed again for other transmissions to other vehicle platforms 103. In some embodiments, the retained segment entry of the retained content segment may include the content segment ID of the retained content segment, the content item ID of the content item including the retained content segment, the relative position of the retained content segment within the content item. In some embodiments, the retained segment entry of the retained content segment may also include the edge server ID(s) of one or more edge servers 107 at which the retained content segment is preserved, a retaining time indicating the amount of time the retained content segment has been preserved at the corresponding edge server 107, a transmission count indicating the number of times the retained content segment is transmitted to the vehicle platforms 103 during the most recent predefined time window (e.g., 5 times during the last 2 hours), etc.

The edge server 107 includes a hardware and/or virtual server that includes a processor, a memory, and network communication capabilities (e.g., a communication unit). In some embodiments, the edge server 107 may be a computing infrastructure located on the roadside of the roads on which the vehicle platforms 103 travel. For example, the edge server 107 may be a roadside unit located within a predetermined distance from the roadway. As depicted, the edge server 107 may be communicatively coupled to the vehicle platforms 103, as reflected by signal line 160, and communicatively coupled to the network 105, as reflected by signal line 162. In some embodiments, the edge servers 107 may provide network access to the network 105 for the vehicle platforms 103 located within its communication coverage area. As an example, FIG. 1B illustrates an example road segment 194 with multiple edge servers 107 provided on the roadside and multiple vehicle platforms 103 travel on the roadway of the road segment 194. Each edge server 107 may have a communication coverage area 192 within which the vehicle platforms 103 can establish a temporary vehicle-to-infrastructure (V2I) connection with the edge server 107 (as reflected by the signal line 160) to send and receive data to and from the edge server 107. The edge server 107 may send and receive the data associated with the vehicle platforms 103 to and from other entities of the system 100 (e.g., the management server 101, other vehicle platforms 103, etc.) via the network 105 using its network connection 162.

For example, as depicted in FIG. 1B, the vehicle platform 103a may be located in a communication coverage area 192a of the edge server 107a. Therefore, the vehicle platform 103a may be communicatively coupled to the edge server 107a via the V2I connection 160a to send and receive data to and from the edge server 107a. The edge server 107a may send and receive data associated with the vehicle platform 103a to and from the management server 101 via the network 105 through the network connection 162a of the edge server 107a. As the vehicle platform 103a proceeds along the road segment 194, the vehicle platform 103a may depart from the communication coverage area 192a of the edge server 107a, and enter the communication coverage area 192b of the edge server 107b directly subsequent to the edge server 107a on its vehicle route. Thus, the vehicle platform 103a may then be communicatively coupled to the edge server 107b via the V2I connection 160b to send and receive data to and from the edge server 107b. The edge server 107b may send and receive data associated with the vehicle platform 103a to and from the management server 101 via the network 105 through the network connection 162b of the edge server 107b. Thus, as the vehicle platform 103a moves from one communication coverage area 192 to another communication coverage area 192 of the edge servers 107, the vehicle platform 103a may be enabled to continuously communicate with other entities of the system 100 via the network 105, through the network connection 162 of the corresponding edge server 107 currently connected to the vehicle platform 103a.

In some embodiments, the edge servers 107 may be provided with limited amount of hardware resources, computation capabilities, and/or network capabilities because of the cost efficiency and their roadside placement. For example, the edge servers 107 may have limited processing capacity, limited memory space, intermittent network connections with relatively low bandwidth, etc. In some embodiments, the limited resources of each edge server 107 may need to be optimally distributed among multiple vehicle platforms 103 that are communicatively coupled to the edge server 107. In some embodiments, the vehicle platforms 103 communicatively coupled to the edge server 107 may include the vehicle platforms 103 located within the communication coverage area 192 of the edge server 107 at a particular point in time. As depicted in FIG. 1A, the edge server 107 may include an instance of the edge-assisted transmission application 120c and a data store 128 that store various types of data for access and/or retrieval by this application.

The data store 128 includes a non-transitory storage medium that stores various types of data. For example, the data store 128 may store one or more content segments of one or more content items for the edge server 107 to transmit to the vehicle platforms 103. In some embodiments, each content segment of a content item may include segment metadata and content data of the content segment. In some embodiments, the segment metadata of the content segment stored in the data store 128 of the edge server 107 may be less complete than the segment metadata of the content segment stored in the content data store 126 of the management server 101. In some embodiments, the segment metadata of the content segment stored in the data store 128 of the edge server 107 may include the unique content segment ID, the content item ID of the content item including the content segment, the relative position of the content segment within the content item, the vehicle ID of the vehicle platform 103 to which the content segment is transmitted for consumption, etc. Other types of segment metadata are also possible and contemplated.

In some embodiments, the content data of the content segment stored in the data store 128 may include original content data of the content segment as received from the management server 101 and/or encoded content data of the content segment as generated from the original content data. The original content data of the content segment may be referred to herein as original content segment, and the encoded content data of the content segment may be referred to herein as encoded content segment. In some embodiments, for each content segment of a content item, the data store 128 may store the original content segment, one or more encoded content segments of various resolution data rates, and/or the resolution data rate associated with each encoded content segment.

In some embodiments, the data store 128 may also store one or more retained content segments. As discussed elsewhere herein, the retained contents segment may be the content segments that are retained at the edge server 107 after the transmission of the content segments to one or more vehicle platforms 103 is completed. In some embodiments, each retained content segment may include segment metadata and content data of the retained content segment. In some embodiments, the segment metadata of the retained content segment stored in the data store 128 of the edge server 107 may be less complete than the segment metadata of the retained content segment stored in the content data store 126 of the management server 101. In some embodiments, the segment metadata of the retained content segment stored in the data store 128 of the edge server 107 may include the content segment ID of the retained content segment, the content item ID of the content item including the retained content segment, the relative position of the retained content segment within the content item, the retaining time of the retained content segment at the edge server 107, etc. In some embodiments, the content data of the retained content segment may include the original retained content segment and/or one or more encoded retained content segment of various resolution data rates.

In some embodiments, the data store 128 may also store one or more performance metrics indicating the operating performance of the edge server 107. The performance metrics may include one or more channel quality metrics and one or more computation load metrics. In some embodiments, the channel quality metrics may indicate the channel quality of the communication channel between the edge server 107 and one or more vehicle platforms 103 communicatively coupled to the edge server 107 (as reflected by the V2I connection 160). In some embodiments, the computation load metrics may indicate the condition of computation load to be processed by the edge server 107 to transmit data to and from these vehicle platforms 103. Other types of performance metrics are also possible and contemplated.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
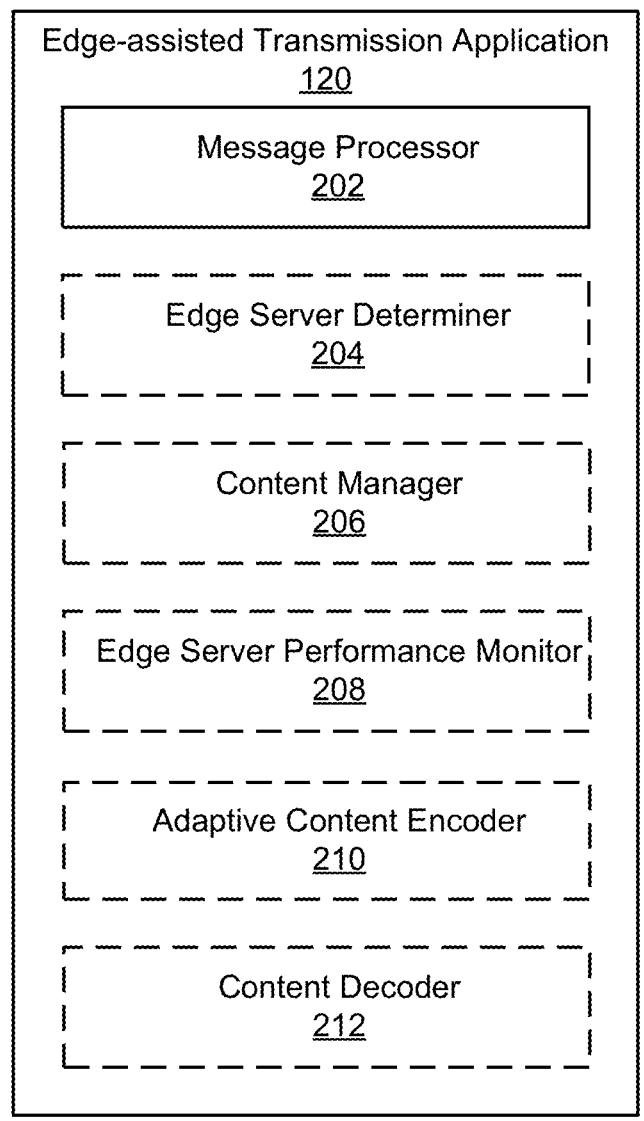
FIG. 2 is a block diagram of an example edge-assisted transmission application.

FIG. 2 is a block diagram of an example edge-assisted transmission application 120. As depicted, the edge-assisted transmission application 120 may include a message processor 202, an edge server determiner 204, a content manager 206, an edge server performance monitor 208, an adaptive encoder 210, and a content decoder 212, although it should be understood that the edge-assisted transmission application 120 may include additional components such as, but not limited to, a configuration engine, a training engine, an encryption/decryption engine, etc., and/or these various components may be combined into a single engine or divided into additional engines.

The message processor 202, the edge server determiner 204, the content manager 206, the edge server performance monitor 208, the adaptive encoder 210, and the content decoder 212 may be implemented as software, hardware, or a combination of the foregoing. The message processor 202, the edge server determiner 204, the content manager 206, the edge server performance monitor 208, the adaptive encoder 210, and the content decoder 212 may be communicatively coupled by bus (e.g., the bus 154) and/or processor (e.g., the processor 115) to one another and/or the other components of the computing device of the entity (e.g., the computing device 152 of the vehicle platform 103). In some embodiments, one or more of the components 120, 202, 204, 206, 208, 210, and/or 212 are sets of instructions executable by the processor (e.g., the processor 115) to provide their functionality. In further embodiments, one or more of the components 120, 202, 204, 206, 208, 210, and/or 212 are storable in the memory (e.g., the memory 117) and are accessible and executable by the processor (e.g., the processor 115) to provide their functionality. In any of the foregoing embodiments, these components 120, 202, 204, 206, 208, 210, and/or 212 may be adapted for cooperation and communication with the processor (e.g., the processor 115) and other components of the computing device of the entity (e.g., the computing device 152 of the vehicle platform 103).

In some embodiments, if the edge-assisted transmission application 120 is included in the vehicle platforms 103, the edge-assisted transmission application 120 may be optionally configured to enable message processor 202, the content decoder 212, and disable other components of the edge-assisted transmission application 120. In some embodiments, if the edge-assisted transmission application 120 is included in the edge servers 107, the edge-assisted transmission application 120 may be optionally configured to enable message processor 202, the content manager 206, the edge server performance monitor 208, the adaptive encoder 210, and disable other components of the edge-assisted transmission application 120. In some embodiments, if the edge-assisted transmission application 120 is included in the management server 101, the edge-assisted transmission application 120 may be optionally configured to enable message processor 202, the edge server determiner 204, the content manager 206, and disable other components of the edge-assisted transmission application 120. The edge-assisted transmission application 120, and its components 202, 204, 206, 208, 210, and 212 are described in further detail below with reference to at least FIGS. 3A-7.

As discussed elsewhere herein, the edge-assisted transmission application 120 is computer logic executable to transmit data to and from the vehicle platforms 103 using the edge servers 107. In some embodiments, the edge-assisted transmission application 120 may receive a request of a vehicle platform 103 for a content item, and determine one or more first edge servers 107 located on the vehicle route of the vehicle platform 103. The edge-assisted transmission application 120 may segment the content item into one or more content segments based on the travel data of the vehicle platform 103 and the edge information of the one or more first edge servers 107, and dispatch each content segment to the corresponding first edge server 107 for transmission to the vehicle platform 103. In some embodiments, the first edge server 107 may receive the content segment of the content item, and adaptively encode the content segment based on the performance condition of the first edge server 107. The first edge server 107 may transmit the encoded content segment to the vehicle platform 103 as the vehicle platform 103 drives through its communication coverage area 192. The vehicle platform 103 may receive the encoded content segment, decoded the encoded content segment, and display the decoded content segment for user consumption in real-time.

FIGS. 3A and 3B illustrate a flowchart of an example method 300 for transmitting data to and from the vehicle platforms 103 using the edge servers 107. In block 302, a first vehicle platform 103 may transmit a first request for a content item to an edge server 107. For example, as the first vehicle platform 103 travels along a first vehicle route to get to a destination, the first request for the content item may be generated by the message processor 202 of the edge-assisted transmission application 120 included in the first vehicle platform 103. The first vehicle platform 103 may be located within a communication coverage area 192 of an initial edge server 107 when the first request for the content item is generated. Therefore, the first vehicle platform 103 may be communicatively coupled to the initial edge server 107, and thus may transmit the first request for the content item to the initial edge server 107 (e.g., via the V2I connection 160).

In some embodiments, the first request for the content item may include a content item ID identifying the content item and the travel data of the first vehicle platform 103 requesting the content item. In some embodiments, the travel data of the first vehicle platform 103 may include the vehicle ID (e.g., a VIN of "BZSE9ZW9O3LXZCEZLN7M"), the vehicle speed (e.g., 67.5 mph), the vehicle geolocation (e.g., GPS coordinates of 40.764519° N, 111.850784° W), etc. of the first vehicle platform 103. In some embodiments, the travel data of the first vehicle platform 103 may also include the first vehicle route currently followed by the first vehicle platform 103 to get to the destination (e.g., the travel path of "University of Utah to Rio Tinto Stadium via freeway I-15"). In some embodiments, in the first vehicle platform 103, the message processor 202 may retrieve the travel data of the first vehicle platform 103 from the vehicle data store 123, aggregate and reorganize the travel data of the first vehicle platform 103 and the content item ID of the content item according to predefined standards to generate the first request for the content item. The first request for the content item may also include other types of travel data associated with the first vehicle platform 103.

In block 304, the initial edge server 107 may transmit the first request for the content item to the management server 101. In particular, in the initial edge server 107, the message processor 202 may forward the first request for the content item to the management server 101 (e.g., via the network connection 162 of the initial the edge server 107 with the network 105). Thus, the management server 101 may receive from the initial edge server 107 the first request for the content item generated by the first vehicle platform 103. In block 306, the management server 101 may process the first request for the content item received from the initial edge server 107. In particular, in the management server 101, the message processor 202 may analyze the first request for the content item to extract the content item ID of the requested content item and the travel data of the first vehicle platform 103 that requests the content item. As discussed elsewhere herein, the travel data of the first vehicle platform 103 may include the vehicle ID, the vehicle speed, the vehicle geolocation, the first vehicle route, etc. of the first vehicle platform 103.

In block 308, the management server 101 may determine whether the requested content item is accessible to the user associated with the first vehicle platform 103 and/or the requested content item is eligible for edge server transmission. In particular, in the management server 101, the content manager 206 may retrieve the access control settings of the content item from the content data store 126, and determine whether the user associated with the first vehicle platform 103 has permission to access the content item based on the access control settings. In some embodiments, the content manager 206 may also retrieve the edge server approval status of the content item from the content data store 126. As discussed elsewhere herein, the edge server approval status may indicate whether the content item is allowed to be transmitted via the edge servers 107. In some embodiments, if the value of the edge server approval status="1," the content manager 206 may determine that the requested content item is eligible for edge server transmission. If the value of the edge server approval status="0," the content manager 206 may determine that the requested content item is not eligible for edge server transmission. In some embodiments, the access control settings and the edge server approval status may be retrieved from the content data store 126 using the content item ID of the requested content item. If in block 308, the content manager 206 determines that the requested content item is accessible to the user associated with the first vehicle platform 103 and/or the requested content item is eligible for edge server transmission, the method 300 may proceed to block 310. Otherwise, the method 300 may end because edge-assisted data transmission is not applicable to the requested content item.

In block 310, the management server 101 may determine one or more first edge servers located on the first vehicle route of the first vehicle platform 103. In particular, in the management server 101, the edge server determiner 204 may retrieve the edge server map including multiple edge servers 107 managed by the management server 101 from the edge server data store 124. The edge server determiner 204 may map the vehicle geolocation of the first vehicle platform 103 and the first vehicle route currently followed by the first vehicle platform 103 to the edge server map. As a result, the edge server determiner 204 may determine one or more first edge servers 107 located on the first vehicle route of the first vehicle platform 103, and between the vehicle geolocation of the first vehicle platform 103 and the destination. In some embodiments, the edge server determiner 204 may also determine the edge server location and the communication coverage area associated with the first edge servers 107 located on the first vehicle route. For example, the edge server determiner 204 may retrieve the edge server location and the coverage data describing the communication coverage area 192 associated with each first edge server 107 from the edge server data store 124.

In some embodiments, each edge server 107 may monitor one or more performance metrics (e.g., the channel quality metrics, the computation load metrics, the amount of available edge server resources, etc.) to keep track of its current condition of operating performance. In block 312, the edge servers 107 may monitor the channel quality metrics. In particular, in each edge server 107, the edge server performance monitor 208 may monitor one or more channel quality metrics of the edge server 107. As discussed elsewhere herein, the channel quality metrics may indicate the channel quality of the communication channel between the edge server 107 and one or more vehicle platforms 103 communicatively coupled to the edge server 107 (as reflected by the corresponding V2I connection 160). Non-limiting examples of the channel quality metrics include, but are not limited to, a signal to noise ratio (SNR) metric, a link quality indicator (LQI) metric, a packet receive rate metric, a round-trip time metric, a packet delay variation metric, etc. associated with the edge server 107. Other channel quality metrics are also possible and contemplated. In some embodiments, the edge server performance monitor 208 may store the channel quality metrics of the edge server 107 in the data store 128.

In block 316, the edge servers 107 may monitor the computation load metrics. In particular, in each edge server 107, the edge server performance monitor 208 may monitor one or more computation load metrics of the edge server 107. As discussed elsewhere herein, the computation load metrics may indicate the condition of computation load to be processed by the edge server 107 to transmit data to and from the connected vehicle platforms 103. Non-limiting examples of the computation load metrics include, but are not limited to, a number of vehicle platforms 103 communicatively coupled to the edge server 107, an available bandwidth metric, a data throughput metric, an amount of available storage space, etc. associated with the edge server 107. Other computation load metrics are also possible and contemplated. In some embodiments, the edge server performance monitor 208 may store the computation load metrics of the edge server 107 in the data store 128.

In some embodiments, the edge servers 107 may optionally transmit the performance metrics to the management server 101. For example, in block 314 and in block 318, each edge server 107 may transmit its channel quality metrics and computation load metrics to the management server 101. This implementation is particularly advantageous, because it allows the management server 101 to be frequently informed of the current operating performance of each edge server 107, and thus the segmentation of the content items can be adapted accordingly. In some embodiments, the edge servers 107 may send the performance metrics to the management server 101 at a predefined interval (e.g., every 2 hours, every 5 hours, etc.). In some embodiments, the management server 101 may store the performance metrics of each edge server 107 as the edge information associated with the edge server 107 in the edge server data store 124.

In block 320, the management server 101 may segment the content item into one or more content segments. In particular, in the management server 101, the content manager 206 may segment the requested content item into one or more content segments based on the travel data of the first vehicle platform 103 and the edge information of each first edge server 107 located on the first vehicle route of the first vehicle platform 103. As discussed elsewhere herein, the travel data of the first vehicle platform 103 may describe the mobility of the first vehicle platform 103 on the first vehicle route, and may be extracted from the first request for the content item. The travel data of the first vehicle platform 103 may include the vehicle ID, the vehicle speed, the vehicle geolocation, the first vehicle route, etc. of the first vehicle platform 103. As discussed elsewhere herein, the edge information of each edge server 107 may describe the edge server 107, and may be retrieved from the edge server data store 124. The edge information of each edge server 107 may include the edge server ID, the edge server geolocation, the performance metrics, the amount of available edge server resources, the coverage geolocation and the coverage boundary of the communication coverage area 192, etc. associated with the edge server 107.

Figure 4:
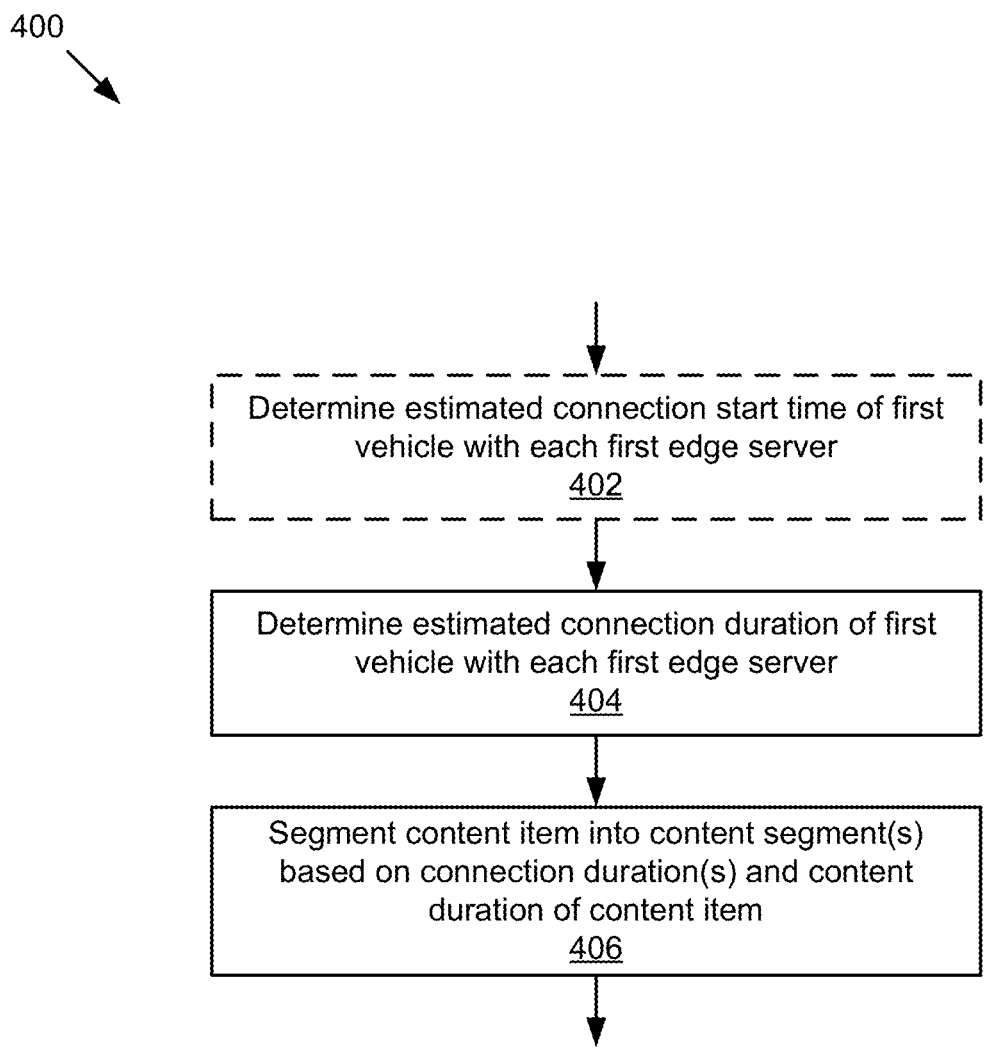
FIG. 4 is a flowchart of an example method for segmenting a content item into multiple content segments.

By way of further illustration, FIG. 4 is a flowchart of an example method 400 for segmenting a content item into multiple content segments. The method 400 may be performed by the content manager 206 of the edge-assisted transmission application 120 included in the management server 101. In block 402, the content manager 206 may optionally determine an estimated connection start time of the first vehicle platform 103 with each first edge server 107 located on the first vehicle route of the first vehicle platform 103. In some embodiments, the estimated connection start time with each first edge server 107 may indicate the estimated time $t_{connection\_start}$ at which the first vehicle platform 103 potentially enters the communication coverage area 192 of the first edge server 107, and thus may be communicatively coupled to the first edge server 107 to start receiving content data. In some embodiments, the estimated connection start time of the first vehicle platform 103 with each first edge server 107 may be determined based on the vehicle speed of the first vehicle platform 103 and the communication coverage area 192 of the first edge server 107.

As an example, referring back to FIG. 1B, assuming that the first vehicle platform 103a generates a first request for content item when the first vehicle platform 103a is located within the communication coverage area 192a of the initial edge server 107a. In this example, also assuming that the first vehicle platform 103a is following a first vehicle route along the road segment 194, with the first edge servers 107b . . . 107n located on the road segment 194 and between the vehicle geolocation of the first vehicle platform 103a and the destination. In this example, to determine the estimated connection start time of the first vehicle platform 103a with a first edge server 107 (e.g., the first edge server 107b), the content manager 206 may determine the distance $d_1$ from the vehicle geolocation of the first vehicle platform 103a to the communication coverage area 192b of the first edge server 107b (e.g., 300 m). The content manager 206 may compute the travel time $\Delta_{t\_enter}$ for the first vehicle platform 103a to travel the distance $d_1$ to reach the communication coverage area 192b using the vehicle speed b of the first vehicle platform 103a (e.g., 30 m/s). For example, the content manager 206 may compute the travel time $\Delta_{t\_enter}=d_1/v)=10$ s. The content manager 206 may then compute the estimated connection start time $t_{connection\_start}$ at which the first vehicle platform 103 potentially enters the communication coverage area 192b of the first edge server 107b using the current time $t_{current}$ (e.g., 14:00:00). For example, the content manager 206 may compute the estimated connection start time $t_{connection\_start}=t_{current}+\Delta_{t\_enter}=14:00:10$.

In block 404, the content manager 206 may determine an estimated connection duration of the first vehicle platform 103 with each first edge server 107 located on the first vehicle route of the first vehicle platform 103. In some embodiments, the estimated connection duration with each first edge server 107 may indicate the estimated time window $\Delta_{t\_stay}$ during which the first vehicle platform 103 potentially stays within the communication coverage area 192 of the first edge server 107, and thus may receive the content data via the corresponding V2I connection 160. In some embodiments, the estimated connection duration of the first vehicle platform 103 with each first edge server 107 may be determined based on the vehicle speed of the first vehicle platform 103 and the communication coverage area 192 of the first edge server 107. It should be understood that the communication coverage area 192 of the first edge servers 107 may vary in geometric shape and/or size. Therefore, the estimated connection duration of the first vehicle platform 103 with different first edge servers 107 may also be different.

Continuing the above example, to determine the estimated connection duration of the first vehicle platform 103a with a first edge server 107 (e.g., the first edge server 107b), the content manager 206 may determine the road segment $d_2$ of the first vehicle route that is located within the communication coverage area 192b of the first edge server 107b (e.g., 900 m). The content manager 206 may then compute estimated connection duration $\Delta_{t\_stay}$ for the first vehicle platform 103a to travel the road segment $d_2$, during which the first vehicle platform 103 is potentially driving through the communication coverage area 192b of the first edge server 107b, and thus can receive content data from the first edge server 107b via the corresponding V2I connection 160. In some embodiments, the estimated connection duration $\Delta_{t\_stay}$ may be determined using the vehicle speed v of the first vehicle platform 103a (e.g., 30 m/s). For example, the content manager 206 may compute the estimated connection duration $\Delta_{t\_stay} = d_2/v = 30$ s.

In block 406, the content manager 206 may segment the content item into one or more content segment using the estimated connection duration of the first vehicle platform 103 with each first edge server 107 located on the first vehicle route, and the content duration of the content item. In some embodiments, the segment duration of each content segment may be directly proportional to the estimated connection duration of the first vehicle platform 103 with the corresponding first edge server 107. In some embodiments, the first edge server 107 corresponding to a content segment may refer to the first edge server 107 designated to transmit the content segment to the first vehicle platform 103. Continuing the above example, assuming that the content item requested by the first vehicle platform 103a is a news report video "Today in politics" with the content duration of 100 s. In this example, also assuming that the content manager 206 determines the estimated connection duration of the first vehicle platform 103 with the first edge server 107b, the first edge server 107c, and the first edge server 107d ($\Delta_{t\_stay}$) to be 30 s, 50 s, and 35 s, respectively. The first edge server 107b, the first edge server 107c, and the first edge server 107d may be sequentially located on the first vehicle route of the first vehicle platform 103 along the road segment 194. Accordingly, the content manager 206 may divide the requested news report video "Today in politics" into a first content segment of 30 s corresponding to the first edge server 107b ($\Delta_{t\_stay} = 30$ s), a second content segment of 50 s corresponding to the first edge server 107c ($\Delta_{t\_stay} = 50$ s), and a third content segment of 20 s corresponding to the first edge server 107d ($\Delta_{t\_stay} = 35$ s).

In some embodiments, the content manager 206 may also segment the content item into one or more content segments based on other factors, such as the performance metrics of the first edge servers 107. For example, in some embodiments, the segment duration of each content segment may be directly proportional to the amount of available edge server resources of the first edge server 107 corresponding to the content segment (e.g., the capacity of free storage space, the percentage of available processing capacity, etc.). In some embodiments, the segment duration of each content segment may be inversely proportional to the computation load to be processed by the first edge server 107 corresponding to the content segment (e.g., the number of received requests, the number of connected vehicle platforms 103, etc.). This implementation is particularly advantageous because the segmentation of the content item can be flexibly adapted to the current condition of operating performance of the first edge servers 107, and thus the utilization of their limited edge server resources can be balanced and optimized.

In some embodiments, the content manager 206 may store the content segments of the content item in the content data store 126. Continuing the above example, the content manager 206 may store the first content segment corresponding to the first edge server 107b, the second content segment corresponding to the first edge server 107c, and the third content segment corresponding to the first edge server 107d of the news report video "Today in politics" in the content data store 126. As discussed elsewhere herein, the content segment stored in the content data store 126 may include the segment metadata and the content data of the content segment. In the above example, the content data the first content segment may include the first 30 s of the news report video "Today in politics." The segment metadata the first content segment may include the content segment ID of the first content segment, the content item ID of the news report video including the first content segment, the relative position of the first content segment within the news report video (e.g., "0:00-0:30"). The segment metadata the first content segment may also include the edge server ID of the first edge server 107b corresponding to the first content segment, the vehicle ID of the first vehicle platform 103a receiving the content data of the first content segment, the estimated connection start time at which the first vehicle platform 103a potentially connected to the first edge server 107b to start receiving the content data (e.g., "14:00:10"), the dispatch status indicating whether the first content segment has been dispatched to the first edge server 107b (e.g., "0"—not yet dispatched), etc.

Referring back to FIG. 3B, in block 322, the management server 101 may dispatch each content segment to the corresponding first edge server 107 for transmission to the first vehicle platform 103. In particular, in the management server 101, the message processor 202 may transmit each content segment (e.g., the content data and the segment metadata) to the first edge server 107 corresponding to the content segment. In some embodiments, only a subset of segment metadata may be transmitted to the corresponding first edge server 107, including the content segment ID, the content item ID of the content item including the content segment, the relative position of the content segment within the content item, the vehicle ID of the first vehicle platform 103 receiving the content data of the content segment, the estimated connection start time at which the first vehicle platform 103 potentially connected to the corresponding first edge server 107 to start receiving the content data, etc. In some embodiments, responsive to the message processor 202 dispatching the content segment of the content item to the corresponding first edge server 107, the content manager 206 may update the dispatch status of the content segment in the content data store 126 to be "1"—already dispatched.

In some embodiments, the management server 101 may dispatch the content segments of the content item to the corresponding first edge servers 107 simultaneously. Continuing the above example, the message processor 202 may parallelly transmit the first content segment to the first edge server 107b, the second content segment to the first edge server 107c, and the third content segment to the first edge server 107d at the same time. In some embodiments, the management server 101 may dispatch each content segment of the content item to the corresponding first edge server 107 prior to the estimated connection start time by a predefined time period. For example, the message processor 202 may transmit the first content segment to the first edge server 107*b* no later than 14:00:05 (5 s earlier than the estimated connection start time of the first vehicle platform 103*a* at "14:00:10"). This implementation is particularly advantageous because the content segment is transmitted to the corresponding first edge server 107 before the first vehicle platform 103 is communicatively coupled to the corresponding first edge server 107 for receiving the content segment. As a result, the latency in transmitting the content segment to the first vehicle platform 103 can be reduced.

In some embodiments, each content segment of the content item may be dispatched to multiple first edge servers 107 located on the first vehicle route of the first vehicle platform 103. As discussed elsewhere herein, the management server 101 may dispatch each content segment to the corresponding first edge server 107 designated to transmit the content segment to the first vehicle platform 103. In some embodiments, the management server 101 may also dispatch that same content segment to one or more first edge servers 107 directly adjacent to the corresponding first edge server 107 on the first vehicle route. Continuing the above example, the message processor 202 may transmit the second content segment of the news report video to its corresponding first edge server 107*c*. In this example, the message processor 202 may additionally transmit the second content segment to the first edge server 107*b* located before the first edge server 107*c*, and the first edge server 107*d* located after the first edge server 107*c* on the first vehicle route along the road segment 194. This implementation is particularly advantageous because it provides flexibility in case the first vehicle platform 103*a* cannot receive the second content segment from the first edge server 107*c* for some reasons (e.g., the first edge server 107*c* is unexpectedly inoperable). In this situation, the first vehicle platform 103 may receive the second content segment of the content item from the first edge server 107*b* or the first edge server 107*d* instead.

In some embodiments, the content segments of the content item may include one or more first content segments that are previously retained at the corresponding first edge servers 107. Thus, the corresponding first edge servers 107 may retrieve these first content segments directly from their data store 128 (rather than receiving these first content segments again from the management server 101) for transmission to the first vehicle platform 103. As a result, unnecessary occupation of the limited bandwidth and processing capacity of the corresponding first edge servers 107 can be avoided. In some embodiments, in the management server 101, the content manager 206 may determine whether one or more first content segments among the content segments of the content item are previously retained at the corresponding first edge servers 107. In particular, the content manager 206 may retrieve the list of retained content segments from the content data store 126, and compare the segment metadata associated with the content segments of the content item to the list of retained content segments to determine the first content segments. For example, the content manager 206 may determine that the second content segment of news report video "Today in politics" has the content item ID of the content item, the relative position of the second content segment within the content item, and the edge server ID of the first edge server 107*c* to which the second content segment is to be transmitted matching the segment data of a retained segment entry in the list of retained content segments. Accordingly, the content manager 206 may determine that the second content segment of the news report video "Today in politics" is previously retained at the first edge server 107*c* corresponding to the second content segment. The content manager 206 may retrieve the content segment ID of the second content segment from the matching retained segment entry.

In some embodiments, in the management server 101, responsive to the content manager 206 determining that the first content segment of the content item is previously retained at the corresponding first edge server 107, the message processor 202 may transmit an instruction of retained content delivery (rather than re-dispatching the first content segment) to the corresponding first edge server 107. In some embodiments, the instruction of retained content delivery may instruct the corresponding first edge server 107 to retrieve the first content segment from its data store 128 for transmission to the first vehicle platform 103. In some embodiments, the instruction of retained content delivery may include the content segment ID of the first content segment previously retained at the corresponding first edge server 107, the vehicle ID of the first vehicle platform 103 receiving the content data of the first content segment, the estimated connection start time at which the first vehicle platform 103 potentially connected to the corresponding first edge server 107 to start receiving the content data, etc.

In some embodiments, as the management server 101 dispatches the content segments of the content item to the corresponding first edge servers 107, the corresponding first edge servers 107 may receive the content segments of the content item from the management server 101. Continuing the above example, the first edge server 107*b* may receive from the management server 101 the first content segment of the news report video "Today in politics" requested by the first vehicle platforma 103*a*. In some embodiments, the corresponding first edge servers 107 may analyze the content segments to extract the content data and the subset of segment metadata associated with each content segment, and store the analyzed content segments in the data store 128. In some embodiments, the content data of the content segment may be subjected to data compression (lossy or lossless) to reduce the transmission data rate required for the corresponding first edge server 107 to transmit the content segment to the first vehicle platform 103.

In block 324, the corresponding first edge servers 107 may determine a target transmission data rate for the content segments received from the management server 101. In particular, in the corresponding first edge server 107, the adaptive content encoder 210 may compute the target transmission data rate for the content segment of the content item based on one or more performance metrics of the corresponding first edge server 107. In some embodiments, the target transmission data rate of a content segment may refer to the highest transmission data rate that the communication channel of the corresponding first edge server 107 (as reflected by the V2I connection 160) can provide for transmitting the content segment without causing transmission congestion to the connected vehicle platforms 103. This implementation is particularly advantageous, because each corresponding first edge server 107 may individually adjust the target transmission data rate of each content segment according to its own current operating performance. Therefore, each content segment may be transmitted to the vehicle platform 103 with the optimal content quality that the corresponding first edge server 107 can provide in particular serving context.

In some embodiments, the adaptive content encoder 210 may retrieve the performance metrics of the corresponding first edge server 107 from the content data store 128. The adaptive content encoder 210 may then compute the target transmission data rate of the content segment based on the performance metrics, such as the channel quality metrics (SNR metrics, LQI metrics, packet receive rate metric, round-trip time metric, packet delay variation metric, etc.), the computation load metrics (number of connected vehicle platforms 103, number of received requests, bandwidth metric, data throughput metric, capacity of free storage space, percentage of available processing capacity, etc.), etc. For example, in some embodiments, the target transmission data rate of the content segment may be directly proportional to the packet receive rate metric, the round-trip time metric, the capacity of free storage space, etc. In some embodiments, the adaptive content encoder 210 may determine the target transmission data rate of the content segment to be the average value of available bandwidth per connected vehicle (e.g., 2 Mbps). Other implementation for computing the target transmission data rate of the content segment are also possible and contemplated.

In block 326, the corresponding first edge servers 107 may adaptively encode the content segments of the content item using the target transmission data rate to generate the encoded content segments. In particular, in the corresponding first edge server 107, the adaptive content encoder 210 may compute the resolution data rate for the content segment based on the target transmission data rate of the content segment. The adaptive content encoder 210 may then adaptively encode the content segment by adjusting one or more encoding parameters to generate the encoded content segment at the computed resolution data rate. Continuing the above example, in the first edge server 107b, the adaptive content encoder 210 may determine the resolution data rate for the first content segment to be a predefined percentage (e.g., 85%) of the computed target transmission data rate (e.g., 2 Mbps). Thus, the adaptive content encoder 210 may adaptively encode the first content segment to generate the encoded first content segment of 1.7 Mbps. In some embodiments, the adaptive content encoder 210 may store the encoded content segment and its resolution data rate in the data store 128.

In some embodiments, the adaptive content encoder 210 may adaptively encode the content segment prior to the estimated connection start time of the first vehicle platform 103 with the corresponding first edge server 107 by a predefined time period. For example, in the first edge server 107b, the adaptive content encoder 210 may encode the first content segment no later than 14:00:08 (2 s earlier than the estimated connection start time of the first vehicle platform 103a at "14:00:10"). This implementation is particularly advantageous because the content segment is encoded and ready to be transmitted to the first vehicle platform 103 before the first vehicle platform 103 is communicatively coupled to the corresponding first edge server 107 for receiving the content segment. As a result, the latency in transmitting the content segment to the first vehicle platform 103 can be reduced.

In some embodiments, instead of receiving the content segments of the content item from the management server 101, the corresponding first edge servers 107 may receive the instruction of retained content delivery associated with the content segments from the management server 101. In these embodiments, the corresponding first edge servers 107 may process the instruction of retained content delivery associated with the content segments, and retrieve these content segment from the data store 128 for encoding and transmission to the first vehicle platform 103. In particular, in the corresponding first edge server 107, the message processor 202 may analyze the instruction of retained content delivery to extract the content segment ID of the content segment previously retained at the corresponding first edge server 107. The adaptive content encoder 210 may then retrieve the content segment from the data store 128 of the corresponding first edge server 107 using the content segment ID of the content segment, and adaptively encode the content segment to generate the encoded content segment of the resolution data rate corresponding to the target transmission data rate. Thus, the encoded content segment of the requested content item may be generated for transmission to the first vehicle platform 103 without receiving the content segment (e.g., the original content segment) again from the management server 101. Therefore, the limited network bandwidth and processing capacity of the corresponding first edge server 107 can be reserved.

In some embodiments, responsive to receiving the instruction of retained content delivery associated with the content segments, the corresponding first edge servers 107 may retrieve the encoded content segments directly from the data store 128. In particular, in the corresponding first edge server 107, the adaptive content encoder 210 may retrieve the encoded content segment previously retained at the corresponding first edge server 107 from the data store 128 using the content segment ID. In some embodiments, the adaptive content encoder 210 may select the encoded content segment from one or more encoded content segments previously retained based on the resolution data rate corresponding to the target transmission data rate. Thus, the encoded content segment of the requested content item may be retrieved directly from the data store 128 for transmission to the first vehicle platform 103 without the need to re-perform data compression to generate the encoded content segment.

In some embodiments, the first edge servers 107 may transmit the encoded content segments of the content item to the first vehicle platform 103 as the first vehicle platform 103 communicatively coupled to the first edge servers 107. In block 328, the first vehicle platform 103 may transmit a connection request to the first edge server 107. Continuing the above example, as the first vehicle platform 103a enters the communication coverage area 192b of the first edge server 107b when travelling on the first vehicle route, the first vehicle platform 103a may transmit the connection request to establish the V2I connection 160 with the first edge server 107b. Once the V2I connection 160 is established, the first vehicle platform 103a is communicatively coupled to the first edge server 107b and thus, the first vehicle platform 103a can receive the content data from the first edge server 107b via the V2I connection 160.

The first edge server 107 may receive the connection request from the first vehicle platform 103. Responsive to receiving the connection request from the first vehicle platform 103, in block 330, the first edge server 107 may process the connection request. In particular, in the first edge server 107, the message processor 202 may analyze the connection request to extract the vehicle ID of the first vehicle platform 103 requesting to establish the V2I connection 160 with the first edge server 107. As the V2I connection 160 between the first edge server 107 and the first vehicle platform 103 is established, in block 332, the first edge server 107 may transmit the encoded content segment of the requested content item to the first vehicle platform 103. In particular, in the first edge server 107, the message processor 202 may retrieve the encoded content segment of the content item requested by the first vehicle platform 103 from the data store 128 using the vehicle ID of the first vehicle platform 103. The message processor 202 may then transmit the encoded content segment to the first vehicle platform 103 via the V2I connection 160.

The first vehicle platform 103 may receive the encoded content segment of the requested content item from the corresponding first edge server 107 via the V2I connection 160. Responsive to receiving the encoded content segment from the corresponding first edge server 107, in block 334, the first vehicle platform 103 may decode the encoded content segment. In particular, in the first vehicle platform 103, the content decoder 212 may decode the encoded content segment to generate the decoded content segment of the requested content item. In block 336, the first vehicle platform 103 may display the decoded content segment for user consumption, e.g., via the input/output device 121.

In some embodiments, the first vehicle platform 103 may receive, decode, and display the content segment in real-time as the first vehicle platform 103 is passing through the communication coverage area 192 of the corresponding first edge server 107. Thus, in the above example depicted in FIG. 1B, the first vehicle platform 103a may receive, decode, and display the first content segment (the first 30 s of the news report video), the second content segment (the next 50 s of the news report video), and the third content segment (the last 20 s of the news report video) as the first vehicle platform 103a is driving through the communication coverage area 192b of the first edge server 107b, the communication coverage area 192c of the first edge server 107c, and the communication coverage area 192d of the first edge server 107d, respectively. Similarly, as depicted, the second vehicle platform 103b may receive, decode, and display the content segments of the content item it requests as the second vehicle platform 103b is driving through the communication coverage areas 192 of the corresponding second edge servers 107 located on its second vehicle route. Because the segmentation of the requested content items into content segments and the encoding of these content segments can be flexibly adapted to the mobility of each individual vehicle platform 103 and the current operating performance of each corresponding edge server 107 as discussed above, the content segments of the requested content items can be delivered to each individual vehicle platform 103 with optimal continuity, transmission latency, and content quality.

Referring back to FIG. 3B, in block 338, responsive to transmitting the encoded content segments of the content item to the first vehicle platform 103, the corresponding first edge servers 107 may transmit a notification of content delivery to the management server 101. In particular, in the corresponding first edge server 107, the message processor 202 may generate the notification of content delivery indicating that a first content segment of the requested content item is delivered to the first vehicle platform 103, and transmit the notification of content delivery to the management server 101. The notification of content delivery may include the content segment ID of the first content segment, the content item ID of the content item including the first content segment, and the vehicle ID of the first vehicle platform 103 to which the encoded first content segment is transmitted, etc.

The management server 101 may receive the notification of content delivery from the first edge servers 107. In block 340, the management server 101 may process the notification of content delivery. In particular, in the management server 101, the message processor 202 may analyze the notification of content delivery to extract the content segment ID of the first content segment, the content item ID of the content item including the first content segment, and the vehicle ID of the first vehicle platform 103 to which the encoded first content segment is transmitted. Continuing the above example, the management server 101 may receive the notification of content delivery from the first edge server 107b among the first edge servers 107 located on the first vehicle route. The management server 101 may analyze the notification of content delivery, and thus may be informed that the first content segment corresponding to the first edge server 107b (e.g., the first 30 s of the news report video) among 3 content segments of the requested news report video "Today in politics" is transmitted to the first vehicle platform 103a.

Figure 5:
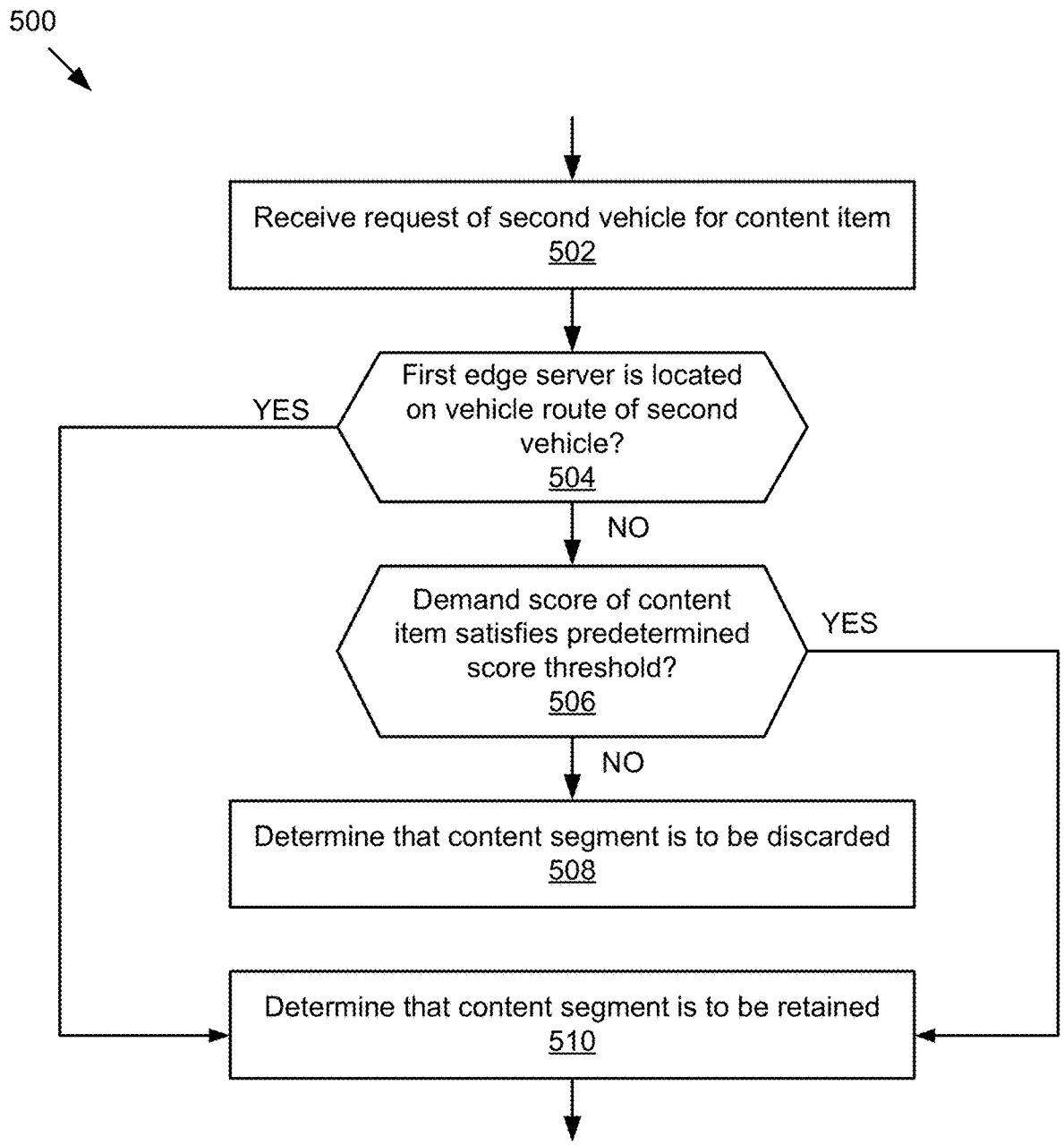
FIG. 5 is a flowchart of an example method for determining whether to retain or to discard a content segment of a content item at an edge server.

With a large number of vehicle platforms 103 travelling along different vehicle routes and requesting a variety of content items, segmenting, dispatching, and encoding a massive number of content segments can be computationally intensive and resource-consuming. Therefore, it is beneficial to retain in the corresponding edge servers 107 the content segments that can be subsequently transmitted to other vehicle platforms 103. In block 342, the management server 101 may determine whether the first content segment is to be retained at the corresponding first edge server 107. By way of further illustration, FIG. 5 is a flowchart of an example method 500 for determining whether to retain or to discard the first content segment at the corresponding first edge server 107. In block 502, the management server 101 may receive a second request of a second vehicle platform 103 for the content item. Continuing the above example, the management server 101 may receive from an edge server 107 a second request generated by a second vehicle platform 103b for the same news report video "Today in politics." As discussed elsewhere herein, responsive to receiving the second request, in the management server 101, the message processor 202 may analyze the second request to extract the travel data of the second vehicle platform 103 that requests the content item. The travel data of the second vehicle platform 103 may include the vehicle ID, the vehicle speed, the vehicle geolocation, the second vehicle route, etc. of the second vehicle platform 103.

In block 504, the management server 101 may determine whether the corresponding first edge server 107 is located on the second vehicle route of the second vehicle platform 103. In particular, in the management server 101, the edge server determiner 204 may map the edge server location (e.g., GPS coordinates) of the corresponding first edge server 107 to which the first content segment of the content item is previously dispatched to the second vehicle route of the second vehicle platform 103 requesting the content item. Accordingly, the edge server determiner 204 may determine whether the corresponding first edge server 107 is located on the second vehicle route of the second vehicle platform 103 and between the vehicle geolocation of the second vehicle platform 103 and the destination. If in block 504, the edge server determiner 204 determines that the corresponding first edge server 107 is located on the second vehicle route of the second vehicle platform 103 and between the vehicle geolocation of the second vehicle platform 103 and the destination, the method 500 proceeds to block 510. In block 510, the content manager 206 may determine that the first content segment is to be retained at the corresponding first edge server 107, because the corresponding first edge server 107 may use the first content segment for transmission to the second vehicle platform 103. If in block 504, the edge server determiner 204 determines that the corresponding first edge server 107 is not located on the second vehicle route of the second vehicle platform 103 and between the vehicle geolocation of the second vehicle platform 103 and the destination, the method 500 proceeds to block 506.

In block 506, the content manager 206 may determine whether the demand score of the content item satisfies a predetermined score threshold. In some embodiments, the demand score of the content item may indicate the demand frequency at which the content item is requested by the vehicle platforms 103. For example, the demand score of the content item may be determined based on the number of times the content item is requested during the most recent predefined time window (e.g., 20 times during the last 4 hours). If in block 506, the content manager 206 determines that the demand score of the content item satisfies the predetermined score threshold, method 500 proceeds to block 510. In block 510, the content manager 206 may determine that the first content segment is to be retained at the corresponding first edge server 107, because the content item is likely requested again and the corresponding first edge server 107 may use the first content segment for later transmission to other vehicle platforms 103 that request the content item. If in block 506, the content manager 206 determines that the demand score of the content item does not satisfy the predetermined score threshold, method 500 proceeds to block 508. In block 508, the content manager 206 may determine that the first content segment is to be discarded at the corresponding first edge server 107.

Referring back to FIG. 3B, if in block 342, the management server 101 determines that the first content segment is to be retained at the corresponding first edge server 107, the method 300 proceeds to block 344. In block 344, the management server 101 may generate an instruction of content retain. In block 346, the management server 101 may transmit the instruction of content retain to the corresponding first edge server 107. In particular, in the management server 101, the message processor 202 may generate the instruction of content retain instructing the corresponding first edge server 107 to retain the first content segment of the content item. The instruction of content retain may include the content segment ID of the first content segment, the content item ID of the content item including the first content segment, the relative position of the first content segment within the content item, etc. The message processor 202 may then transmit the instruction of content retain to the corresponding first edge server 107.

The corresponding first edge server 107 may receive the instruction of content retain associated with the first content segment from the management server 101. Responsive to receiving the instruction of content retain associated with the first content segment, in block 348, the corresponding first edge server 107 may retain the first content segment. In particular, in the corresponding first edge server 107, the message processor 202 may analyze the instruction of content retain to extract the content segment ID of the first content segment to be retained, the content item ID of the content item including the first content segment, and the relative position of the first content segment within the content item. The content manager 206 may then retain the first content segment in the data store 128. In particular, the content manager 206 may store the segment metadata and content data of the first content segment in the data store 128 as a retained content segment. In some embodiments, the first content segment may be retained in the data store 128 with the original first content segment as received from the management server 101 (the content data is not encoded) and/or one or more encoded first content segments of various resolution data rates.

If in block 342, the management server 101 determines that the first content segment is to be discarded at the corresponding first edge server 107, the method 300 proceeds to block 350. In block 350, the management server 101 may generate an instruction of content discard. In block 352, the management server 101 may transmit the instruction of content discard to the corresponding first edge server 107. In particular, in the management server 101, the message processor 202 may generate the instruction of content discard instructing the corresponding first edge server 107 to discard the first content segment of the content item. In some embodiments, the instruction of content discard may also instruct the corresponding first edge server 107 to release the edge server resources allocated to the first content segment. The instruction of content discard may include the content segment ID of the first content segment, and the content item ID of the content item including the first content segment, etc. The message processor 202 may then transmit the instruction of content discard to the corresponding first edge server 107.

The corresponding first edge server 107 may receive the instruction of content discard associated with the first content segment from the management server 101. Responsive to receiving the instruction of content discard associated with the first content segment, in block 354, the corresponding first edge server 107 may discard the first content segment and/or release the edge server resource allocated to the first content segment. In particular, in the corresponding first edge server 107, the message processor 202 may analyze the instruction of content discard to extract the content segment ID of the first content segment to be discarded, and the content item ID of the content item including the first content segment. The content manager 206 may then remove the first content segment from the data store 128. For example, the content manager 206 may delete the first content segment (e.g., the original first content segment) and/or the one or more encoded first content segments from the data store 128, thereby releasing the storage space of the data store 128 occupied by the first content segment. In some embodiments, the edge server performance monitor 208 may release the edge server resources allocated to the first content segment (e.g., network bandwidth, memory space, processing capacity, etc.) to make these edge server resources available for transmitting other content segments to the vehicle platforms 103. This implementation is particularly advantageous, because it avoids unnecessary occupation of the limited edge server resources associated with the first edge servers 107. In some embodiments, the content manager 206 may keep track of the retaining time that the first content segment has been retained at the corresponding first edge server 107. In some embodiments, the first content segment may be automatically discarded at the corresponding first edge server 107 as the retaining time of the first content segment satisfies a predefined retaining threshold (e.g., 7 days).

Figure 7:
FIG. 7 illustrates an example of a first vehicle route and an alternative second vehicle route including multiple edge servers.

In some embodiments, the vehicle platforms 103 may change their vehicle routes from the original vehicle routes as the vehicle platforms 103 travel along the roads. Continuing the above example, the first vehicle platform 103a may originally plan to follow the first vehicle route of "University of Utah to Rio Tinto Stadium via freeway I-15." FIG. 7 illustrates a portion of the first vehicle route with the first vehicle platform 103a, and multiple edge servers 107 located between the vehicle geolocation of the first vehicle platform 103a and the destination of Rio Tinto Stadium on the first vehicle route. As depicted, multiple edge servers 107 located on the first vehicle route may include the edge server 702 on the road segment 750, the edge servers 704, 706, and 708 on the road segment 752, and the edge servers 710, 712, and 714 on the road segment 754 of the first vehicle route along the freeway I-15. In this example, assuming that the first vehicle platform 103a takes a detour, and thus, instead of following the road segment 750, 752, and 754 of the first vehicle route, the first vehicle platform 103a may follow the road segment 750, 756, 758, 760, and 754 of a second vehicle route to get to the same destination of Rio Tinto Stadium. As depicted, there are multiple edge servers 107 located on the second vehicle route between the vehicle geolocation of the first vehicle platform 103a and the destination. Multiple edge servers 107 located on the second vehicle route may include the edge server 702 on the road segment 750, the edge server 730 on the road segment 756, the edge servers 732, 734, and 736 on the road segment 758, the edge server 738 on the road segment 760, and the edge servers 710, 712, and 714 on the road segment 754 of the second vehicle route.

Figure 6B:
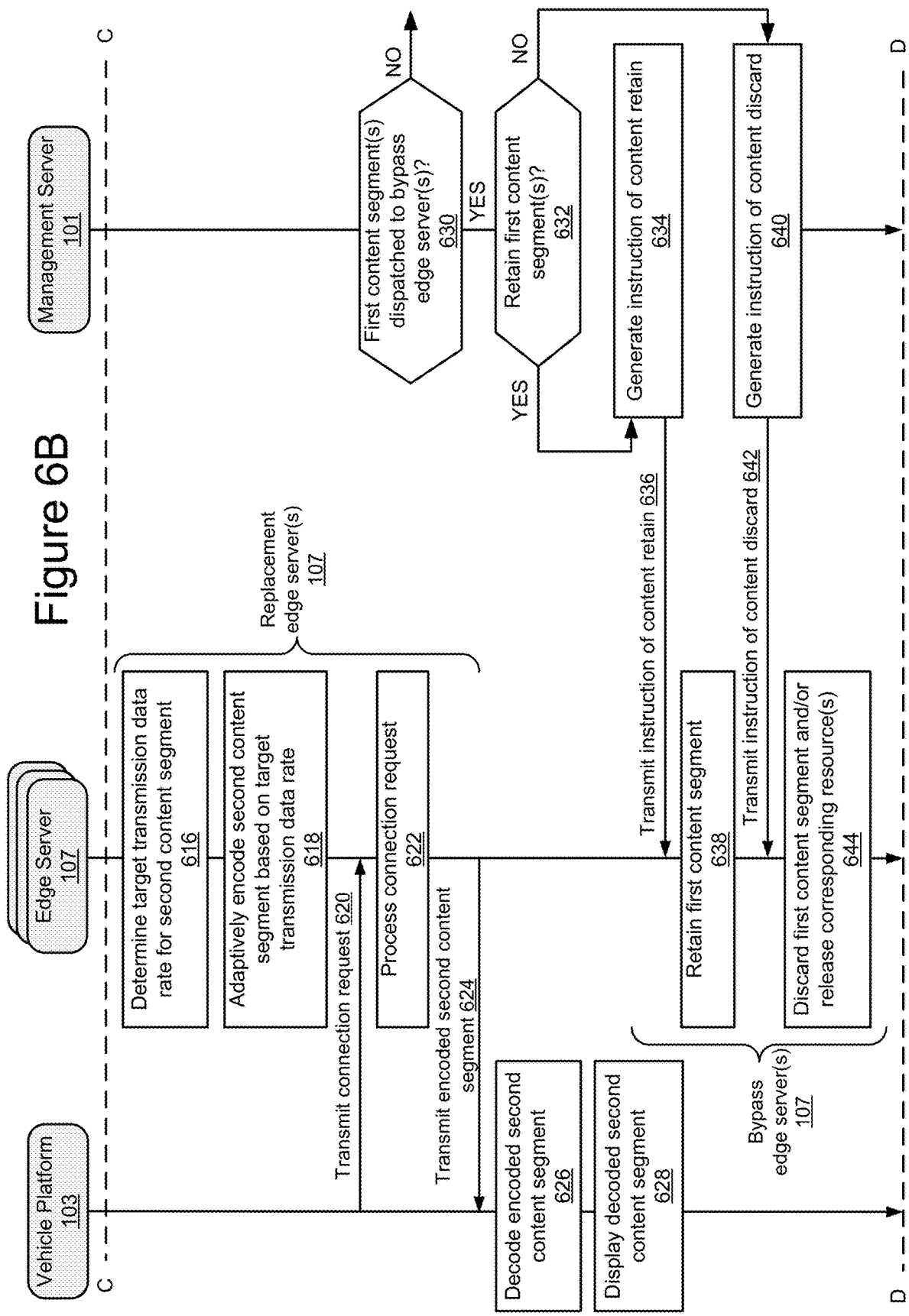

FIGS. 6A and 6B illustrate a flowchart of an example method 600 for transmitting data to and from the vehicle platforms 103 using the edge servers 107 upon a dynamic change in vehicle route. In block 602, a first vehicle platform 103 may transmit a notification of route change to an edge server 107. In the above example, as the first vehicle platform 103a changes from the first vehicle route to the second vehicle route, the notification of route change may be generated by the message processor 202 of the edge-assisted transmission application 120 included in the first vehicle platform 103a. As depicted in FIG. 7, the first vehicle platform 103a may be located within the communication coverage area 192 of the edge server 702 when the notification of route change is generated. Therefore, the first vehicle platform 103a may be communicatively coupled to the edge server 702, and thus may transmit the notification of route change to the edge server 702 (e.g., via the V2I connection 160).

In some embodiments, the notification of route change may include the content item ID of the content item requested by the first vehicle platform 103 and the updated travel data of the first vehicle platform 103. In some embodiments, one or more content segments of the requested content item may already be transmitted to the first vehicle platform 103 by one or more edge servers 107 located on the first vehicle route before the vehicle route is changed. In some embodiments, the updated travel data the first vehicle platform 103 may include the vehicle ID, the vehicle speed, the vehicle geolocation, etc. of the first vehicle platform 103 when the route change is made, and the second vehicle route that the first vehicle platform 103 is now following to get to the destination. In some embodiments, the second vehicle route of the first vehicle platform 103 may be calculated by the navigation application 122 included in the first vehicle platform 103.

In block 604, the edge server 107 may transmit the notification of route change to the management server 101. Continuing the above example, in the edge server 702, the message processor 202 may forward the notification of route change to the management server 101 (e.g., via the network connection 162 of the edge server 702 with the network 105). Thus, the management server 101 may receive from the edge server 702 the notification of route change generated by the first vehicle platform 103a. In block 606, the management server 101 may process the notification of route change received from the edge server 107. In particular, in the management server 101, the message processor 202 may analyze the notification of route change to extract the content item ID of the requested content item and the updated travel data of the first vehicle platform 103 that requests the content item. As discussed elsewhere herein, the updated travel data of the first vehicle platform 103 may include the vehicle ID, the vehicle speed, the vehicle geolocation, the second vehicle route, etc. of the first vehicle platform 103.

In block 608, the management server 101 may determine one or more bypass edge servers 107 located on the first vehicle route of the first vehicle platform 103. In block 610, the management server 101 may determine one or more replacement edge servers 107 located on the second vehicle route of the first vehicle platform 103. In particular, in the management server 101, the edge server determiner 204 may retrieve the edge server map including multiple edge servers 107 managed by the management server 101 from the edge server data store 124. The edge server determiner 204 may map the vehicle geolocation, the first vehicle route, and the second vehicle route of the first vehicle platform 103 to the edge server map. As a result, the edge server determiner 204 may determine one or more bypass edge servers 107 located on the first vehicle route but not on the second vehicle route, and thus, can no longer be communicatively coupled to the first vehicle platform 103 to transmit the corresponding content segments of the content item. In some embodiments, the bypass edge servers 107 may be located between the vehicle geolocation of the first vehicle platform 103 and the destination on the first vehicle route. In the above example, the edge server determiner 204 may determine the bypass edge servers 107 to be the edge servers 704, 706, and 708. The edge server determiner 204 may also determine one or more replacement edge servers 107 located on the second vehicle route but not on the first vehicle route, and thus, have not yet received the content segments of the content item from the management server 101 for transmission to the first vehicle platform 103. In some embodiments, the replacement edge servers 107 may be located between the vehicle geolocation of the first vehicle platform 103 and the destination on the second vehicle route. In the above example, the edge server determiner 204 may determine the replacement edge servers 107 to be the edge servers 730, 732, 734, 736, and 738.

In block 612, the management server 101 may optionally adjust one or more first content segment of the content item corresponding to the bypass edge servers 107 on the first vehicle route to generate one or more second content segments of the content item corresponding to the replacement edge servers 107 on the second vehicle route. In particular, in the management server 101, the content manager 206 may determine the first content segments corresponding to the bypass edge servers 107. The first content segments corresponding to the bypass edge servers 107 may be the content segments of the content item originally assigned to the bypass edge servers 107 for transmission to the first vehicle platform 103. Each first content segment of the content item may already be dispatched or may not yet be dispatched to the corresponding bypass edge server 107.

In some embodiments, the content manager 206 may retrieve the first content segments corresponding to the bypass edge servers 107 from the content data store 126 using the content item ID of the requested content item, the vehicle ID of the first vehicle platform 103, and the edge server ID of the corresponding bypass edge servers 107. The content manager 206 may then adjust the first content segments corresponding to the bypass edge servers 107 using the edge information of the replacement edge servers 107, thereby generating the second content segments to be transmitted by the replacement edge servers 107 to the first vehicle platform 103. As discussed elsewhere herein, the edge information of the replacement edge server 107 may include the edge server geolocation and the coverage data describing the communication coverage area 192 of the replacement edge server 107. In some embodiments, the content manager 206 may re-segment the first content segments into the second content segments. The segmentation performed by the content manager 206 is described in details with reference to FIG. 4, and thus not repeated again for brevity.

Continuing the above example depicted in FIG. 7, the content manager 206 may determine 3 first content segments of the requested content item corresponding to 3 bypass edge servers 107. In particular, the content manager 206 may determine the first content segment 1 of 55 s corresponding to the bypass edge server 704, the first content segment 2 of 45 s corresponding to the bypass edge server 706, and the first content segment 3 of 50 s corresponding to the bypass edge server 708 (total segment duration=150 s). In this example, the content manager 206 may divide these 3 first content segments into 5 second content segments corresponding to 5 replacement edge servers 107. In particular, based on the mobility of the first vehicle platform 103 (e.g., the vehicle speed) and the communication coverage area 192 of the replacement edge servers 107, the content manager 206 may re-segment the first content segment 1 of 55 s, the first content segment 2 of 45 s, and the first content segment 3 of 50 s into the second content segment 1 of 35 s corresponding to the replacement edge server 730, the second content segment 2 of 30 s corresponding to the replacement edge server 732, the second content segment 3 of 25s corresponding to the replacement edge server 734, the second content segment 4 of 40 s corresponding to the replacement edge server 736, and the second content segment 5 of 20 s corresponding to the replacement edge server 738 (total segment duration=150 s).

In some embodiments, all content segments of the content item corresponding to the first edge servers 107 located on the first vehicle route may be subjected to the adjustment of content segments. In particular, the content manager 206 may re-segment all content segments corresponding to the first edge servers 107 located on the first vehicle route using the edge information of second edge servers 107 located on the second vehicle route. In some embodiments, only the first edge servers 107 and the second edge servers 107 located between the vehicle geolocation of the first vehicle platform 103 and the destination on the first vehicle route and the second vehicle route may be considered. Continuing the above example depicted in FIG. 7, the content manager 206 may re-segment the content segments originally generated for transmission by the edge servers 702, 704, 706, 708, 710, 712, 714, etc. located on the first vehicle route to generate the adjusted content segments to be transmitted by the edge servers 702, 730, 732, 734, 736, 738, 710, 712, 714, etc. located on the second vehicle route. The edge information of the edge servers 702, 730, 732, 734, 736, 738, 710, 712, 714, etc. located on the second vehicle route may be used for such re-segmentation. This implementation is particularly advantageous because the content segments of the requested content item can be specifically adjusted to the second edge servers 107 included in the second vehicle route currently followed by the first vehicle platform 103. However, this implementation may be computationally intensive and resource-consuming, and thus may be more practically applicable outside the time windows of heavy traffic.

In some embodiments, the management server 101 may dispatch one or more adjusted content segments of the content item to the second edge servers 107 located on the second vehicle route for transmission to the first vehicle platform 103. For example, in block 614, the management server 101 may dispatch one or more second content segments adjusted from the first content segments to one or more replacement edge servers 107 on the second vehicle route. In particular, in the management server 101, the message processor 202 may transmit each second content segment to the replacement edge server 107 corresponding to the second content segment. Accordingly, in the above example, the message processor 202 may transmit the second content segment 1 to the replacement edge server 730, the second content segment 2 to the replacement edge server 732, the second content segment 3 to the replacement edge server 734, the second content segment 4 to the replacement edge server 736, and the second content segment 5 to the replacement edge server 738. In some embodiments, the transmission of the adjusted content segments to the second edge servers 107 on the second vehicle route may be performed in a manner similar to the transmission of the originally generated content segments to the first edge servers 107 on the first vehicle route as discussed elsewhere herein. For example, the message processor 202 may dispatch the second content segments of the content item to the replacement edge servers 107 simultaneously and/or prior to the estimated connection start time of the first vehicle platform 103 to the corresponding replacement edge server 107. As another example, each second content segment of the content item may be dispatched to multiple replacement edge servers 107 located on the second vehicle route. Other implementations are also possible and contemplated.

In some embodiments, the management server 101 may directly dispatch one or more first content segments corresponding to one or more bypass edge servers 107 on the first vehicle route to one or more replacement edge servers 107 on the second vehicle route for transmission to the first vehicle platform 103 without adjusting the first content segments. In particular, in the management server 101, the content manager 206 may retrieve the first content segments corresponding to the bypass edge servers 107 from the content data store 126. The message processor 202 may then transmit each first content segment retrieved from the content data store 126 to the corresponding replacement edge server 107 designated to transmit the first content segment to the first vehicle platform 103 on the second vehicle route. Accordingly, in the above example, the message processor 202 may transmit the first content segment 1 originally corresponding to the bypass edge server 704 to the replacement edge server 730, the first content segment 2 originally corresponding to the bypass edge server 706 to the replacement edge server 732, and the first content segment 3 originally corresponding to the bypass edge server 706 to the replacement edge server 734.

In these embodiments, in addition to dispatching the first content segments corresponding to the bypass edge servers 107 on the first vehicle route to the replacement edge servers 107 on the second vehicle route, the management server 101 may also re-dispatch other content segments originally corresponding to other first edge servers 107 on the first vehicle route to the second edge servers 107 on the second vehicle route to avoid interruption in user consumption of the content segments. Continuing the above example, the message processor 202 may additionally transmit the content segment originally corresponding to the edge server 710 on the first vehicle route to the replacement edge server 736 on the second vehicle route, the content segment originally corresponding to the edge server 712 on the first vehicle route to the replacement edge server 738 on the second vehicle route, the content segment originally corresponding to the edge server 714 on the first vehicle route to the edge server 710 on the second vehicle route, etc.

In some embodiments, as the management server 101 dispatches the content segments of the content item to the second edge servers 107 on the second vehicle route, these second edge servers 107 on the second vehicle route may receive the content segments of the content item, adaptively encode the content segments, and transmit the encoded content segments to the first vehicle platform 103. For example, the replacement edge servers 107 located on the second vehicle route may receive the second content segments of the content item from the management server 101. In block 616, the replacement edge servers 107 may determine a target transmission data rate for the second content segments (e.g., based on the performance metrics of the replacement edge server 107 designated to transmit each second content segment). In block 618, the replacement edge servers 107 may adaptively encode the second content segments of the content item using the target transmission data rate to generate the encoded second content segments.

In block 620, the first vehicle platform 103 may transmit a connection request to a replacement edge server 107 as the first vehicle platform 103 enters the communication coverage area 192 of the replacement edge server 107 when travelling on the second vehicle route. Responsive to receiving the connection request from the first vehicle platform 103, in block 622, the replacement edge server 107 may process the connection request and establish the V2I connection 160 with the first vehicle platform 103 accordingly. In block 624, the replacement edge server 107 may retrieve the encoded second content segment of the content item requested by the first vehicle platform 103 from the data store 128, and transmit the encoded second content segment to the first vehicle platform 103 via the V2I connection 160.

Responsive to receiving the encoded second content segment from the corresponding replacement edge server 107, in block 626, the first vehicle platform 103 may decode the encoded second content segment to generate the decoded second content segment of the requested content item. In block 628, the first vehicle platform 103 may display the decoded second content segment for user consumption, e.g., via the input/output device 121. Accordingly, as the content segments of the content item may be optionally adjusted and reassigned from the first edge servers 107 on the first vehicle route to the second edge servers 107 on the second vehicle route for transmission to the first vehicle platform 103, the first vehicle platform 103 may still receive the content segments of the requested content item in case the first vehicle platform 103 makes a route change from the first vehicle route to the second vehicle route. In some embodiments, the adaptive encoding of the second content segments, the transmission of the encoded second content segments to the first vehicle platform 103, and the decoding of the encoded second content segments to display for user consumption may be performed in a manner similar to those described in details with reference to FIG. 3B, and thus not repeated again for brevity.

In some embodiments, the first content segments of the content item reassigned from the first edge servers 107 on the first vehicle route to the second edge servers 107 on the second vehicle route for transmission due to route change may be retained or discarded at the first edge servers 107. For example, in block 630, the management server 101 may determine whether one or more first content segments are dispatched to one or more bypass edge servers 107 located on the first vehicle route. In particular, in the management server 101, the content manager 206 may retrieve dispatch status of the first content segment from the content data store 126 using the content segment ID. As discussed elsewhere herein, the dispatch status may indicate whether a content segment is already dispatched to the corresponding edge server 107 (e.g., the dispatch status="0"—not yet dispatched, the dispatch status="1"—already dispatched). If in block 630, the content manager 206 determines that none of the first content segments are dispatched to the corresponding bypass edge servers 107 on the first vehicle route, the method 600 may end because the edge server resources of the bypass edge servers 107 are not occupied by the first content segments. If in block 630, the content manager 206 determines that one or more first content segments are already dispatched to one or more corresponding bypass edge servers 107 on the first vehicle route, the method 600 proceeds to block 632.

In block 632, the management server 101 may determine whether the one or more first content segments are to be retained at the one or more corresponding bypass edge servers 107 on the first vehicle route. For example, the management server 101 may determine that a first content segment is to be retained at the corresponding bypass edge server 107 because such bypass edge server 107 is located on another vehicle route of another vehicle platform 103 that requests the same content item including the first content segment. As another example, the management server 101 may determine that the first content segment is to be retained at the corresponding bypass edge server 107 because the demand score of the content item including the first content segment satisfies the predetermined score threshold, and thus such content item is likely requested again by other vehicle platforms 103. Otherwise, the management server 101 may determine that the first content segment is to be discarded at the corresponding bypass edge server 107.

If in block 632, the management server 101 determines that the first content segment is to be retained at the corresponding bypass edge server 107, the method 600 proceeds to block 634. In block 634, the management server 101 may generate an instruction of content retain instructing the corresponding bypass edge server 107 to retain the first content segment of the content item. In block 636, the management server 101 may transmit the instruction of content retain associated with the first content segment to the corresponding bypass edge server 107. Responsive to receiving the instruction of content retain associated with the first content segment, in block 638, the corresponding bypass edge server 107 may retain the first content segment. For example, the corresponding bypass edge server 107 may store the first content segment in the data store 128 as a retained content segment for later use in transmission to other vehicle platforms 103.

If in block 632, the management server 101 determines that the first content segment is to be discarded at the corresponding bypass edge server 107, the method 600 proceeds to block 640. In block 640, the management server 101 may generate an instruction of content discard instructing the corresponding bypass edge server 107 to discard the first content segment of the content item. In some embodiments, the instruction of content discard may also instruct the corresponding bypass edge server 107 to release one or more edge server resources allocated to the first content segment (e.g., network bandwidth, memory space, processing capacity, etc.). In block 642, the management server 101 may transmit the instruction of content discard associated with the first content segment to the corresponding bypass edge server 107. Responsive to receiving the instruction of content discard associated with the first content segment, in block 644, the corresponding bypass edge server 107 may discard the first content segment. For example, the corresponding bypass edge server 107 may delete the first content segment from the data store 128 and/or release the edge server resources allocated to the first content segment. In some embodiments, the determination of whether to retain or to discard the first content segments at the bypass edge servers 107, the transmission of the instruction of content retain or the instruction of content discard, and the processing operations in response to the received instructions may be performed in a manner similar to those described in details with reference to FIG. 3B and FIG. 5, and thus not repeated again for brevity.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
   receiving a first request of a first vehicle for a content item;
   receiving travel data of the first vehicle including a first vehicle route of the first vehicle;
   determining one or more first edge servers located on the first vehicle route of the first vehicle;
   segmenting the content item into one or more content segments based on the travel data of the first vehicle and edge information of each first edge server;
   dispatching each content segment to a corresponding first edge server for transmission to the first vehicle;
   receiving a notification of route change including a second vehicle route of the first vehicle;
   determining one or more bypass edge servers located on the first vehicle route of the first vehicle;
   determining one or more replacement edge servers located on the second vehicle route of the first vehicle;
   determining, from the one or more content segments of the content item, one or more first content segments corresponding to the one or more bypass edge servers; and
   dispatching the one or more first content segments corresponding to the one or more bypass edge servers to the one or more replacement edge servers for transmission to the first vehicle.

2. The method of claim 1, wherein the edge information of each first edge server includes coverage data describing a communication coverage area of the first edge server and one or more performance metrics of the first edge server.

3. The method of claim 1, wherein:
   the travel data of the first vehicle includes a vehicle speed of the first vehicle; and
   segmenting the content item into the one or more content segments includes:
      determining an estimated connection duration of the first vehicle with each first edge server using the vehicle speed of the first vehicle and a communication coverage area of the first edge server; and
      segmenting the content item into the one or more content segments using the estimated connection duration of the first vehicle with each first edge server and a content duration of the content item.

4. The method of claim 1, wherein dispatching each content segment to the corresponding first edge server for transmission to the first vehicle includes:
   determining that a first content segment among the one or more content segments is previously retained at the corresponding first edge server; and
   responsive to determining that the first content segment is previously retained at the corresponding first edge server, transmitting an instruction of retained content delivery instructing the corresponding first edge server to retrieve the first content segment previously retained at the corresponding first edge server for transmission to the first vehicle.

5. The method of claim 1, further comprising:
   determining an estimated connection start time of the first vehicle with each first edge server based on a vehicle speed of the first vehicle and a communication coverage area of the first edge server, wherein:
   dispatching each content segment to the corresponding first edge server for transmission to the first vehicle includes dispatching each content segment to the corresponding first edge server prior to the estimated connection start time.

6. The method of claim 1, further comprising:
   receiving, from a first edge server among the one or more first edge servers, a notification of content delivery indicating that a first content segment corresponding to the first edge server among the one or more content segments is transmitted to the first vehicle;
   determining that the first content segment is to be retained at the first edge server; and
   responsive to determining that the first content segment is to be retained at the first edge server, transmitting an instruction of content retain instructing the first edge server to retain the first content segment.

7. The method of claim 6, wherein determining that the first content segment is to be retained at the first edge server includes:
   receiving a second request of a second vehicle for the content item;
   receiving travel data of the second vehicle including a second vehicle route of the second vehicle; and
   determining that the first edge server is located on the second vehicle route of the second vehicle.

8. The method of claim 6, wherein determining that the first content segment is to be retained at the first edge server includes:
   determining a demand score of the content item; and
   determining that the demand score of the content item satisfies a predetermined score threshold.

9. A method comprising:
   receiving a first request of a first vehicle for a content item;
   receiving travel data of the first vehicle including a first vehicle route of the first vehicle;
   determining one or more first edge servers located on the first vehicle route of the first vehicle;
   segmenting the content item into two or more sequential content segments based on the travel data of the first vehicle and edge information of each first edge server;

sequentially dispatching each of the two or more sequential content segment to a corresponding first edge server for transmission to the first vehicle;
receiving a notification of route change including a second vehicle route of the first vehicle;
determining one or more bypass edge servers located on the first vehicle route of the first vehicle;
determining one or more replacement edge servers located on the second vehicle route of the first vehicle;
determining, from the two or more sequential content segments of the content item, one or more first content segments corresponding to the one or more bypass edge servers; and
dispatching the one or more first content segments corresponding to the one or more bypass edge servers to the one or more replacement edge servers for transmission to the first vehicle.

10. A method comprising:
receiving a first request of a first vehicle for a content item;
receiving travel data of the first vehicle including a first vehicle route of the first vehicle;
determining one or more first edge servers located on the first vehicle route of the first vehicle;
segmenting the content item into one or more content segments based on the travel data of the first vehicle and edge information of each first edge server;
dispatching each content segment to a corresponding first edge server for transmission to the first vehicle;
receiving a notification of route change including a second vehicle route of the first vehicle;
determining one or more bypass edge servers located on the first vehicle route of the first vehicle;
determining one or more replacement edge servers located on the second vehicle route of the first vehicle;
determining, from the one or more content segments of the content item, one or more first content segments corresponding to the one or more bypass edge servers;
adjusting the one or more first content segments to generate one or more second content segments using edge information of each replacement edge server; and
dispatching the one or more second content segments to the one or more replacement edge servers for transmission to the first vehicle.

11. The method of claim 10, further comprising:
determining that the one or more first content segments are dispatched to the one or more bypass edge servers;
responsive to determining that the one or more first content segments are dispatched to the one or more bypass edge servers, determining that the one or more first content segments are to be discarded at the one or more bypass edge servers; and
responsive to determining that the one or more first content segments are to be discarded at the one or more bypass edge servers, transmitting an instruction of content discard instructing the one or more bypass edge servers to discard the one or more first content segments.

12. The method of claim 11, wherein the instruction of content discard instructs the one or more bypass edge servers to release one or more edge server resources allocated to the one or more first content segments.

13. A system comprising:
one or more processors; and
one or more memories storing instructions that, when executed by the one or more processors, cause the system to:
receive a first request of a first vehicle for a content item;
receive travel data of the first vehicle including a first vehicle route of the first vehicle;
determine two or more first edge servers located on the first vehicle route of the first vehicle;
segment the content item into two or more sequential content segments based on the travel data of the first vehicle and edge information of each first edge server;
sequentially dispatch each sequential content segment to a corresponding first edge server for transmission to the first vehicle,
receive a notification of route change including a second vehicle route of the first vehicle;
determine one or more bypass edge servers located on the first vehicle route of the first vehicle;
determine one or more replacement edge servers located on the second vehicle route of the first vehicle;
determine, from the two or more sequential content segments of the content item, one or more first content segments corresponding to the one or more bypass edge servers;
adjust the one or more first content segments to generate one or more second content segments using edge information of each replacement edge server; and
dispatch the one or more second content segments to the one or more replacement edge servers for transmission to the first vehicle.

14. The system of claim 13, wherein the edge information of each first edge server includes coverage data describing a communication coverage area of the first edge server and one or more performance metrics of the first edge server.

15. The system of claim 13, wherein:
the travel data of the first vehicle includes a vehicle speed of the first vehicle; and
to segment the content item into the two or more sequential content segments includes:
determining an estimated connection duration of the first vehicle with each first edge server using the vehicle speed of the first vehicle and a communication coverage area of the first edge server; and
segmenting the content item into the two or more sequential content segments using the estimated connection duration of the first vehicle with each first edge server and a content duration of the content item.

16. The system of claim 13, wherein to sequentially dispatch each sequential content segment to the corresponding first edge server for transmission to the first vehicle includes:
determining that a first content segment among the two or more sequential content segments is previously retained at the corresponding first edge server; and
responsive to determining that the first content segment is previously retained at the corresponding first edge server, transmitting an instruction of retained content delivery instructing the corresponding first edge server to retrieve the first content segment previously retained at the corresponding first edge server for transmission to the first vehicle.

17. The system of claim 13, wherein the instructions, when executed by the one or more processors, further cause the system to:

receive, from a first edge server among the two or more first edge servers, a notification of content delivery indicating that a first content segment corresponding to the two or more sequential content segments is transmitted to the first vehicle;

determine that the first content segment is to be retained at the first edge server; and responsive to determining that the first content segment is to be retained at the first edge server, transmit an instruction of content retain instructing the first edge server to retain the first content segment.

18. The system of claim 17, wherein to determine that the first content segment is to be retained at the first edge server includes:

receiving a second request of a second vehicle for the content item;

receiving travel data of the second vehicle including a second vehicle route of the second vehicle; and determining that the first edge server is located on the second vehicle route of the second vehicle.

19. The system of claim 17, wherein to determine that the first content segment is to be retained at the first edge server includes:

determining a demand score of the content item; and determining that the demand score of the content item satisfies a predetermined score threshold.

20. The system of claim 13, wherein the instructions, when executed by the one or more processors, further cause the system to:

determine that the one or more first content segments are dispatched to the one or more bypass edge servers;

responsive to determining that the one or more first content segments are dispatched to the one or more bypass edge servers, determine that the one or more first content segments are to be discarded at the one or more bypass edge servers; and responsive to determining that the one or more first content segments are to be discarded at the one or more bypass edge servers, transmit an instruction of content discard instructing the one or more bypass edge servers to discard the one or more first content segments and release one or more edge server resources allocated to the one or more first content segments.

* * * * *